United States Patent [19]

Kammath et al.

[11] Patent Number: 5,887,058
[45] Date of Patent: Mar. 23, 1999

[54] DIGIT PARSING FOR A FLEXIBLE DIAL PLAN CAPABILITY IN A TELECOMMUNICATIONS SWITCH

[75] Inventors: Ramesh Kammath, Plano, Tex.; Mulugu S. Kumar, Hyderabad, India; Santharaj Kuppuswamy, Bangalore, India; Vamsee Krishna, Chittoor, India; Kumar A. Basavaraj; Balijepalli Ramakrishna, both of Bangalore, India; Bradford A. Zavattari; James R. Daniel, both of Dallas, Tex.; Steven C. Loss, Plano, Tex.; Ronald S. Goldman, Parker, Tex.; Chandrashekar B. Benakatti, Plano, Tex.

[73] Assignee: Alcatel USA Sourcing, L.P., Plano, Tex.

[21] Appl. No.: 777,783

[22] Filed: Dec. 31, 1996

Related U.S. Application Data

[60] Provisional application No. 60/013,628 Mar. 18, 1996.

[51] Int. Cl.[6] .............................. H04M 3/00; G06F 15/38
[52] U.S. Cl. .................. 379/284; 364/274.8; 364/972.1; 364/DIG. 1; 364/DIG. 2; 379/242; 379/268; 379/269
[58] Field of Search ..................................... 379/112, 113, 379/201, 207, 219, 220, 221, 242, 243, 269, 280, 284, 268; 364/274.8, 972.1, DIG. 1, DIG. 2

[56] References Cited

U.S. PATENT DOCUMENTS

| | | | |
|---|---|---|---|
| 4,882,699 | 11/1989 | Evensen | 379/284 |
| 5,333,188 | 7/1994 | Bogart et al. | 379/220 |

FOREIGN PATENT DOCUMENTS

| | | | |
|---|---|---|---|
| 0540254 | 10/1992 | European Pat. Off. | 379/220 |
| 0540256 | 10/1992 | European Pat. Off. | 379/220 |
| 0557644 | 10/1992 | European Pat. Off. | 379/207 |
| 2535139 | 10/1982 | France . | |

OTHER PUBLICATIONS

Search Report, PCT/US/97/04578, Sep. 5, 1997.

*Primary Examiner*—Harry S. Hong
*Attorney, Agent, or Firm*—Baker & Botts, L.L.P.

[57] ABSTRACT

A telecommunications switch (12) includes a dial plan database (300) used for creating, identifying, and verifying dial plan codes and dialing sequences of a desire dial plan (100). The dial plan (100) is created through a craft terminal (201) that communicates with a craft interface (200) of the telecommunications switch (12). The telecommunications switch (12) uses dial plans created and stored within the dial plan database (300) in performing a digit parsing routine. The digit parsing routine identifies dial plan codes and dialing sequences through digit collection by systematically eliminating possible dial plan codes until one is identified. The identified dial plan code is processed by performing valid or error actions associated with the identified dial plan code. The digit parsing routine continues with an incoming call until it has been appropriately handled and awaits for the next incoming call digits to be received.

10 Claims, 10 Drawing Sheets

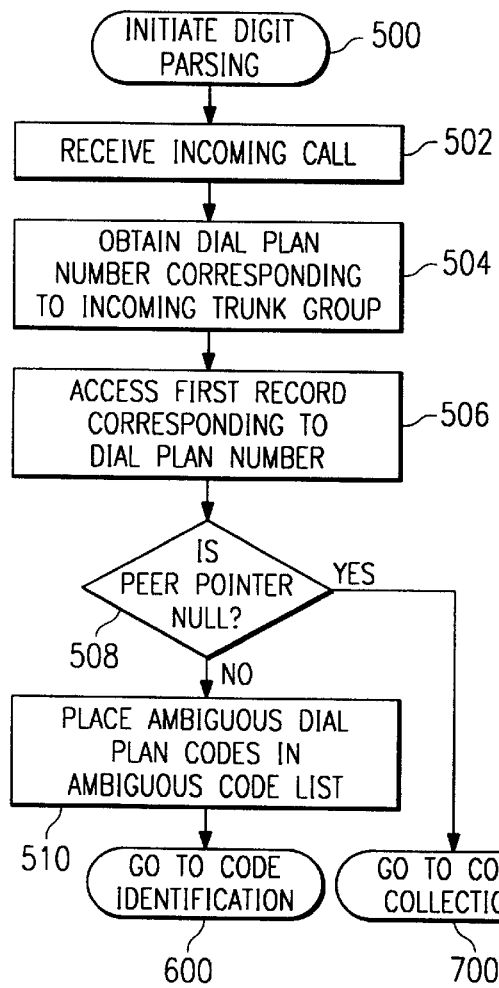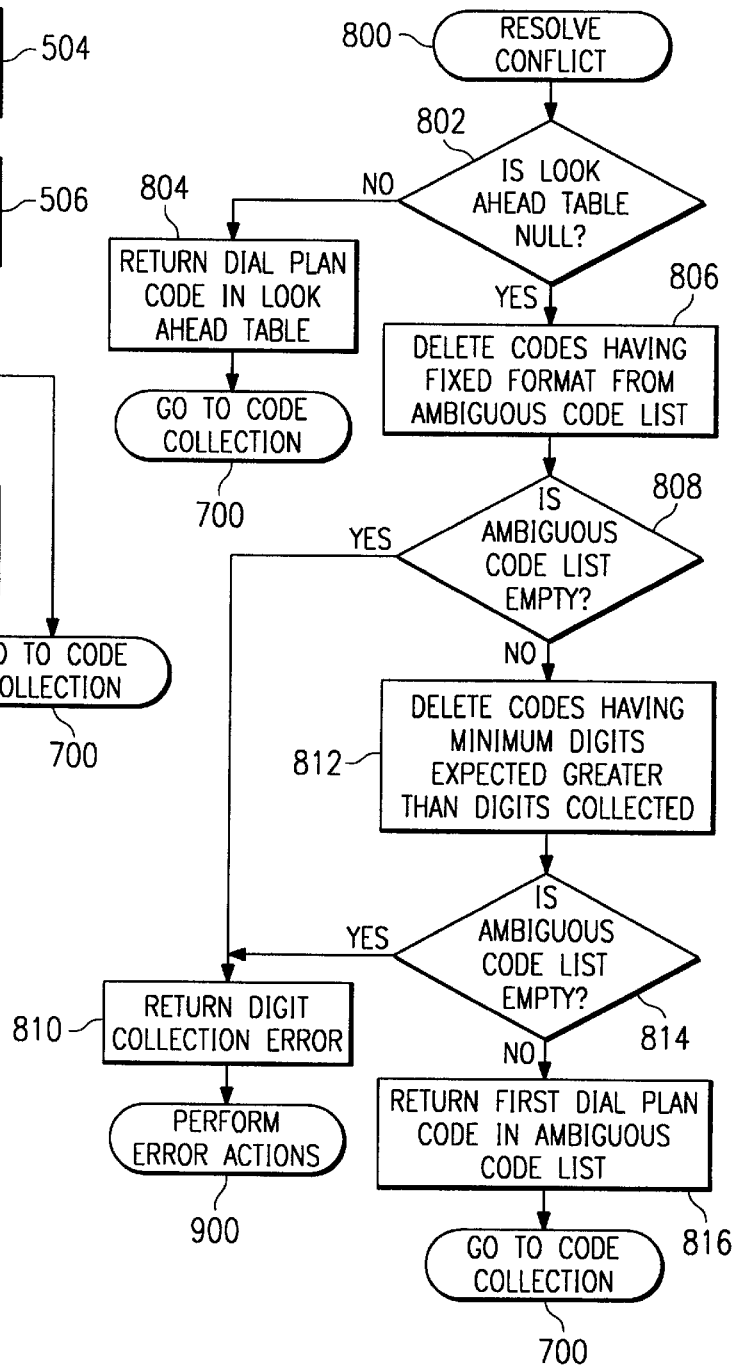

5,887,058

DIGIT PARSING FOR A FLEXIBLE DIAL PLAN CAPABILITY IN A TELECOMMUNICATIONS SWITCH

TECHNICAL FIELD OF THE INVENTION

The present invention relates in general to telecommunications processing techniques and more particularly to a method of parsing digits to provide a flexible dial plan capability in a telecommunications switch.

RELATED PATENT APPLICATION

This application claims the benefit of U.S. Provisional Application No. 60/013,628, filed on Mar. 18, 1996.

BACKGROUND OF THE INVENTION

Telecommunications switches typically operate in known environments with fixed dial plans and the expected digit patterns are pre-defined. By knowing what the digit patterns will be, the telecommunications switch uses an inflexible hard coded program to identify the received digit patterns. However, each country has its own telecommunication numbering plan and dialing sequence. The hard coded telecommunications switches are specifically defined for a particular country and would not operate in other countries. Therefore, it is desirable to have a telecommunication switch that is flexible to function in many, if not all, operating environments without requiring changes to hardware of software in order to meet the needs of a particular environment.

SUMMARY OF THE INVENTION

From the foregoing, it may be appreciated that a need has arisen for a telecommunication switch with global operating capabilities. In accordance with the present invention, a method of digit parsing for a flexible dial plan capability in a telecommunications switch is provided that substantially eliminates or reduces disadvantages and problems associated with conventional hard coded telecommunications switches.

According to an embodiment of the present invention, there is provided a method of digit parsing for a flexible dial plan capability in a telecommunications switch that includes collecting digits corresponding to an incoming call and comparing the collected digits to a dial plan stored within a dial plan database. A digit parsing routine identifies dial plan codes in a dialing sequence regardless of the operating environment of the telecommunications switch.

The present invention provides various technical advantages over conventional hard coded telecommunications switches. For example, one technical advantage is having a telecommunications switch capable of operating anywhere in the world. Another technical advantage is providing a digit parsing routine that can identify any global dialing sequence. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 5 illustrates a flow diagram of the digit parsing routine;

FIG. 7 illustrates a flow diagram of a resolve conflict function for the digit parsing routine;

DETAILED DESCRIPTION OF THE INVENTION

Figure 1:
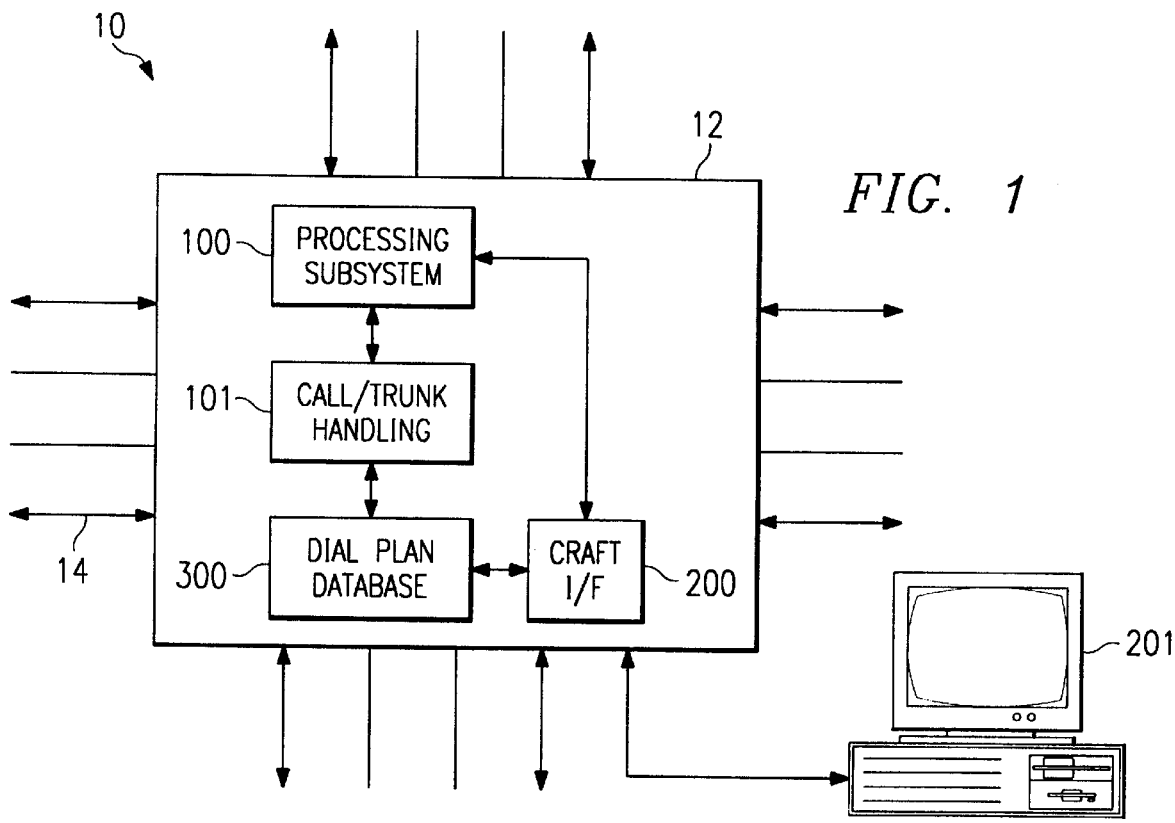
FIG. 1 illustrates a block diagram of a telecommunications switch.

FIG. 1 is a block diagram of a portion of a telecommunications network 10. Telecommunications network 10 includes a telecommunications switch 12 providing communication with the network over a plurality of trunk groups 14. Telecommunications switch 12 includes a processing subsystem 100, a call/trunk handler 101, a dial plan database 300, and a craft interface 200. Telecommunications switch 12, through dial plan database 300 is capable of accepting different numbering plans and processing any dialed digits to connect a call to a desired destination within telecommunications network 10. Dial plan database 300 is created by a user through a craft terminal 201. Craft interface 200 provides access to telecommunications switch 12 for craft terminal 201. Different dialing plans can be programmed into telecommunications switch 12 through craft terminal 201 in order to provide flexible dial plan capabilities. An incoming call transported over a trunk group 14 is received at call/trunk handler 101 for processing by processing subsystem 100 in accordance with dial plans programmed into dial plan database 300. Telecommunications switch 12 collects digits dialed by the subscriber to determine the appropriate dial plan for proper routing of the incoming call.

The plurality of trunk groups 14 provide incoming calls to telecommunication switch 12. Each trunk group 14 is associated with a unique dialing plan that consists of a set of dialing sequences. A dialing sequence contains the information required to complete a call within telecommunication switch 12. The dialing sequences include identifying the type of call, the subscriber identity, any billing information, and the called number. The subscriber dials one of the dialing sequences of the dial plan in order to make a call.

A dialing sequence contains a list of numbers called dial plan codes. A dial plan code is a digit stream recognized by telecommunication switch 12 for specific call related information. Typically, a dial plan code may specify functions that include calling type information, subscriber identity, or called number. Digits for a dial plan code follow a specified characteristic format which makes a dial plan code distinct from other codes. Dialing sequences also specify switch related actions which include directing telecommunication switch 12 to either validate the information, modify the call parameters, apply a treatment to a call, or abandon the call. These actions are associated with a specified dial plan code. An action can be either a valid action or an error action.

Figure 2:
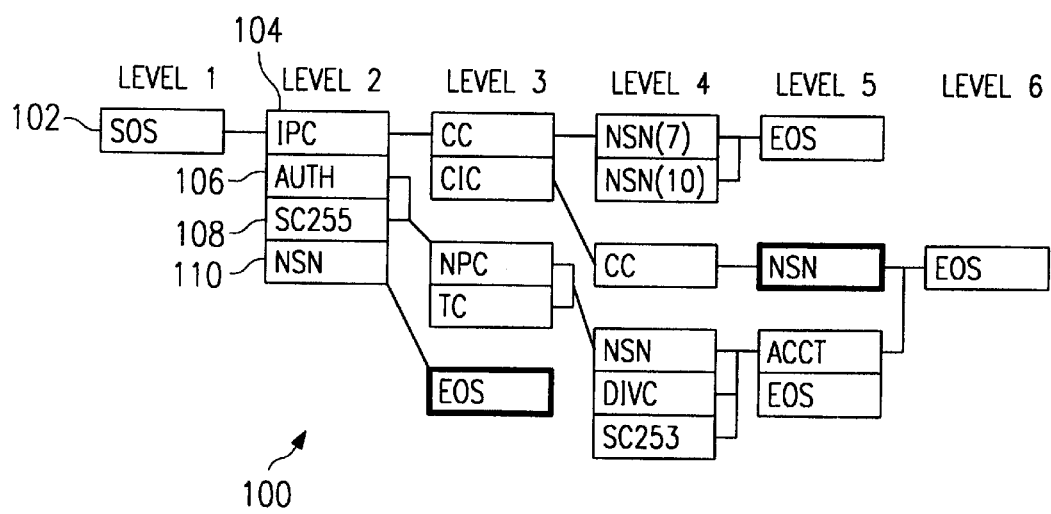
FIG. 2 illustrates a block diagram of a dial plan.

A dial plan code and its associated actions are collectively identified as a node in a dialing sequence. A dialing sequence consists of a stream of nodes. Each dial plan is stored in dial plan database 300 as a tree of nodes. A particular path traversed in this tree forms a dialing sequence. FIG. 2 illustrates an example of a dial plan 100. Dial plan 100 consists of several nodes where each node is represented by a box and consists of a dial plan code and associated actions. The nodes are arranged into separate levels where each level signifies the rank of a node. A dialing sequence traverses the tree from left to right through each level of dial plan 100 along branches connecting one level to another.

After the first node 102 in level 1, four nodes 104, 106, 108, and 110 may be chosen at level 2. A subscriber can dial any of the four dial plan codes of the four nodes at level 2. The four nodes form a peer list, or cluster, having the same predecessor node. A level may have more than one cluster and each cluster has at least one node. Thus, level 3 has three separate clusters. Further, after dialing any of the dial plan codes in level 2, the subscribers choice of further dial plan codes is limited to the nodes in the cluster which are branching off from a dialed node into level 3. Each node has a branch into the next successive level which may be shared by other nodes in the same level. Each node in the tree of dial plan 100 can then be defined by three parameters—the level number, the cluster number, and the node number.

Figure 3:
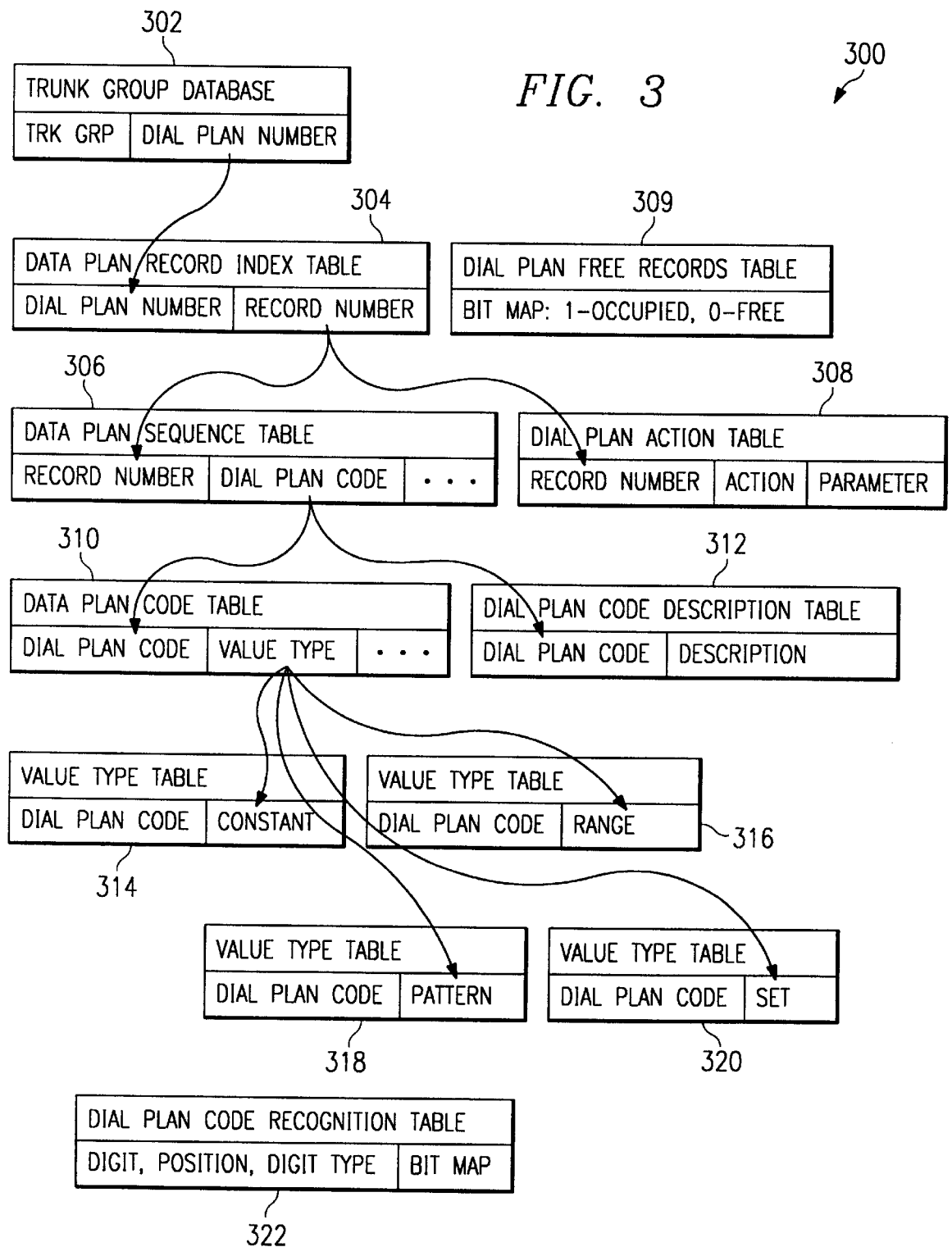
FIG. 3 illustrates a block diagram of a dial plan database within the telecommunications switch.

FIG. 3 shows an example of dial plan database 300 within telecommunication switch 12. Dial plan database 300 includes a plurality of tables used to define each dial plan. The tables in dial plan database 300 are used by the call processing routines in processing subsystem 100 of telecommunication switch 12 during digit collection, digit parsing, and digit analysis of user dialed information. A dial plan in dial plan database 300 of telecommunication switch 12 is defined by a unique dial plan number. A dial plan number associated with every trunk group is stored in a trunk group database 302. Trunk group database 302 provides the dial plan number corresponding to the trunk group of the incoming call. The dial plan number is used as an index to a dial plan record index table 304 which contains an address to the first record of a dial plan. Every dialing sequence possible in a dial plan is stored in a series of records linked to one another within a dial plan sequence table 306. Each record in dial plan sequence table 306 corresponds to a dial plan code and node of a dial plan tree. The processing actions to be followed by a dial plan code are stored in a dial plan action table 308. Every record in dial plan sequence table 306 indexes a corresponding record in dial plan action table 308. The availability of a record for access is determined by a dial plan free records table 309.

The properties of each dial plan code are stored in a dial plan code table 310 indexed by a dial plan code number found within dial sequence table 306. A verbose description of each dial plan code is stored in a dial plan code description table 312 indexed by a dial plan code number. Additional properties of each dial plan code are stored in dial plan code value type tables 314, 316, 318, and 320 that provide constant, range, pattern, and set value type options to further define each dial plan code. A dial plan code recognition table is used by telecommunication switch 12 to systematically eliminate dial plan codes in order to identify the correct dial plan code for processing.

Table 1 shows an example structure for dial plan sequence table 306. Dial plan sequence table 306 specifies the dial plan code number, the minimum and maximum expected number of digits to be collected for this dial plan code, a next sequence pointer, and a peer pointer. The next sequence pointer indexes the record number of the dial plan code in the next level of the dial plan tree or to the head of the peer list in the next level of the dial plan tree for the specified dialing sequence. The peer pointer indexes the record number of the next dial plan code in the peer list of the current level which includes the current dial plan code.

TABLE 1

Dial Plan Sequence Table

| FIELD | LENGTH | DESCRIPTION |
| --- | --- | --- |
| Record # | | Index for this table |
| Dial Plan Code number | 8 bits | Stores the Dial Plan Code number. |
| Minmum Length | 8 bits | Stores the minmum number of expected digits to be collected for this code. |
| Maximum Length | 8 bits | Stores the maximum number of expected digits to be collected for this code. When not entered by craft, the default length stored in the Dial Plan Code Table is used. |
| Next record pointer | 16 bits | Indexes the record number of the next level Dial Plan Code or to the head of a peer list (cluster in the next level). |
| Peer record pointer | 16 bits | Indexes the record number of.the next Dial Plan Code in a peer list (next node in the cluster) at the current level. |

Table 2 shows an example structure for dial plan action table 308. Dial plan action table 308 provides for a number of valid actions to be executed, an action number corresponding to actions to be performed, and an action parameter associated with the action to be performed. For illustrative purposes, each record within dial plan action table 308 has a total of twelve action items. Telecommunications switch 12 performs various actions during call processing when a dial plan code is collected. Action items are separated into valid actions and error actions according to the number of valid actions to be executed. Valid actions are performed when digit collection is completed successfully. Error actions are performed when the digit collection stage identifies a digit collection error. Table 3 shows examples of valid actions and Table 4 shows examples of error actions.

TABLE 2

Dial Plan Action Table

| FIELD | LENGTH | DESCRIPTION |
| --- | --- | --- |
| Record # | | Index for this table |
| Number of valid actions | 8 bits | Stores the total number of action items |
| Action number 1 | 8 bits | Stores the action processing routine number. |
| Action parameter 1 | 8 bits | Stores the parameter value to be passed on to the processing routine indicated by action number 1. |
| Action number 2 | 8 bits | Stores the action processing routine number. |
| Action parameter 2 | 8 bits | Stores the parameter value to be passed on to the processing routine indicated by action number 2. |
| Action number 3 | 8 bits | Stores the action processing routine number. |
| Action parameter 3 | 8 bits | Stores the parameter value to be passed on to the processing routine indicated by action number 3. |
| Action number 4 | 8 bits | Stores the action processing routine number. |

TABLE 2-continued

Dial Plan Action Table

| FIELD | LENGTH | DESCRIPTION |
|---|---|---|
| Action parameter 4 | 8 bits | Stores the parameter value to be passed on to the processing routine indicated by action number 4. |
| Action number 5 | 8 bits | Stores the action processing routine number. |
| Action parameter 5 | 8 bits | Stores the parameter value to be passed on to the processing routine indicated by action number 5 |
| Action number 6 | 8 bits | Stores the action processing routine number. |
| Action parameter 6 | 8 bits | Stores the parameter value to be passed on to the processing routine indicated by action number 6. |
| Action number 7 | 8 bits | Stores the action processing routine number. |
| Action parameter 7 | 8 bits | Stores the parameter value to be passed on to the processinq routine indicated by action number 7 |
| Action number 8 | 8 bits | Stores the action processing routine number. |
| Action parameter 8 | 8 bits | Stores the parameter value to be passed on to the processing routine indicated by action number 8. |
| Action number 9 | 8 bits | Stores the action processing routine number. |
| Action parameter 9 | 8 bits | Stores the parameter value to be passed on to the processing routine indicated by action number 9. |
| Action number 10 | 8 bits | Stores the action processing routine number. |
| Action parameter 10 | 8 bits | Stores the parameter value to be passed on to the processing routine indicated by action number 10. |
| Action number 11 | 8 bits | Stores the action processing routine number. |
| Action parameter 11 | 8 bits | Stores the parameter value to be passed on to the processing routine indicated by action number 11. |
| Action number 12 | 8 bits | Stores the action processing routine number. |
| Action parameter 12 | 8 bits | Stores the parameter value to be passed on to the processing routine indicated by action number 12. |

TABLE 3

Valid Action Examples

| ACTION NUMBER | ACTION NAME | PARAMETER VALUES | ACTION DESCRIPTION |
|---|---|---|---|
| 1 | Connect tone till next digit | A tone number is given as parameter value. The valid tone numbers are 1 to 24. | The action routine will send a connect tone message (message ES8) to switch matrix processor and will set a flag to indicate that a tone has been made on and the same has to be disconnected when next digit is received. |
| 2 | Connect tone | A tone number is given as parameter value. The valid tone numbers are 1 to 24. | The action routine will send a message to switch matrix processor to connect the specified tone and will set a flag to indicate that a tone has been made on. |
| 3 | Connect a treatment tone for specified time | A treatment number is given as a parameter value. The valid treatment numbers are 1 to 99. | The first tone given in the treatment table corresponding to the treatment number is selected and the time specified for this tone is also read from the TREAT table. The action routine sends a message to switch matrix processor to connect this tone. After the time delay specified by this treatment, another message to disconnect tone is sent to the switch matrix processor. |
| 4 | Disconnect tone | No parameter | A message to connect silence tone is sent to switch matrix processor |
| 5 | Continue and process next sequence | No parameter | In the normal case this action routine returns the result "continue dial plan" and the caller of this function fetches the dial plan database record pointed to by the "next sequence pointer" and starts processing the dial plan. If any of the previous actions have requested a change in digit collection method, then the current digit collection/ parsing program is terminated and a request to collect and parse digits is sent to the appropriate subsystem which is responsible for collecting the digits and |

TABLE 3-continued

Valid Action Examples

| ACTION NUMBER | ACTION NAME | ACTION PARAMETER VALUES | ACTION DESCRIPTION |
|---|---|---|---|
| 6 | Continue with another dial plan | Dial plan number 1–255 | processing the dial plan. The result "end" is returned to the caller of This routine shall check if the dial plan number referred to is not the same one being processed. If the dial plan number is same as the one being processed, generate IPR and abandon digit collection. In the normal case, this action routine returns the result "continue dial plan" and the caller of this function fetches the required dial plan database record and starts processing the dial plan. If any of the previous actions have requested a change in digit collection method, then the current digit collection/parsing program is terminated and a request to collect and parse |
| 7 | Validate | Dial plan code 0–255 | A processing routine to validate the dial plan code specified is executed. If the dial plan code specified in the parameter value is 0, then validate the dial plan code just collected. For all system defined dial plan codes, the address of routine to be called to do this function shall be available in a valid action address table. |
| 8 | Route | No parameter | Perform pre-translation actions for the dial plan. If pre-translation detects an error |
| 9 | Set billing type | Billing type value 1 to 15. | condition and determines the call has to be routed to exception or a digit collection error has to be reported, the digit collection failure message is sent to originating trunk sequence subsystem. If no errors are detected, send message to translator processor to translate the digits and terminate digit collection. The value specified is stored in the call information data area for the element billing type. |
| 10 | Disable automatic routing | No parameter | Set a flag in call information area indicating that this call shall not be processed for routing automatically. |
| 11 | Set operator assistace | No parameter | Set a flag in call information area indicating that the call type information shall indicate this call as an operator assisted call. |
| 12 | Store as dial plan code | Dial plan code 1–255 | The digits collected are transferred to the digit buffer reserved for the dial plan code specified. |
| 13 | Extract another dial plan code from the digits collected for the last dial plan code | Dial plan code 1–255 | The digits collected for the last dial plan code has another dial plan code (one specified as the parameter) at the end of the digit string. The digit string is analyzed from the last digit collected. Extract the number of digits required for the dial plan code specified. |
| 14 | Wait for a digit | Digit type and digit numbers. | Collect a digit. Check whether the |

TABLE 3-continued

Valid Action Examples

| ACTION NUMBER | ACTION NAME | ACTION PARAMETER VALUES | ACTION DESCRIPTION |
|---|---|---|---|
| | | Bits 7–4 store digit type and bits 3–0 store digit number. | received digit is equal to the digit specified in the parameter value. If not, continue collecting till the digit requested is received or a time out occurs. The digit collected should be stored as the next available digit and when a request for next digit is received this shall be returned as the collected digit. |
| 15 | Ignore a digit | Digit type and digit number. Bits 7–4 store digit type and bits 3–0 store digit number. | Collect a digit. Check whether the received digit is equal to the digit specified in the parameter value. If it is, continue collecting till the digit received is not equal to the digit specified in the parameter value or a time out occurs. The digit collected should be stored as the next available digit and when a request for next digit is received this shall be returned as the collected digit. |
| 16 | Collect digits | Number of digits | Collect the number of digits specified in the parameter value and store them in the digits available buffer. When digit collection is done though DTMF/MF/Dial Pulse/MFC-R2, if a time out occurs, digit collection is stopped and the time out digit is stored in the available digits buffer. |
| 16 cont'd. | | | When digit collection is done through C7 signaling, the digits are collected from the address signal parameter of the IAM message. If required number of digits are not available in the address signal parameter, and if subsequent address messages are awaited, a timer (Tadd - waiting for SAM/SAO) is started. If no subsequent address messages are received, a time out digit is stored in the available digits buffer and it also sets a flag to indicate that no more subsequent address messages are expected. |
| 17 | Collect digits till time out | No parameter | Collect digits and store them in digits available buffer till time out occurs. When digit collection is done through C7 signaling, the digits are collected from the address signal parameter of the IAM message. If required number of digits are not available in the address signal parameter, and if subsequent address messages are awaited, a timer (Tadd - waiting for SAM/SAO) is started. If no subsequent address messages are received, a time out digit is stored in the available digits buffer and it also sets a flag to indicate that no more subsequent address messages are expected. |
| 18 | Collect digits till the specified digit is received or time out | Digit type and digit number. Bits 7–4 store digit type and bits 3–0 store digit number. | Collect all digits and store them in the digits available buffer till the digit specified is received or a |

TABLE 3-continued

Valid Action Examples

| ACTION NUMBER | ACTION NAME | ACTION PARAMETER VALUES | ACTION DESCRIPTION |
|---|---|---|---|
| 18 cont'd. | | | time out occurs. If a time out occurs, time out digit is stored in the digits available buffer. When digit collection is done through C7 signaling, the digits are collected from the address signal parameter of the IAM message. If required number of digits are not available in the address signal parameter, and if subsequent address messages are awaited, a timer (Tadd - waiting for SAM/SAO) is started. If no subsequent address messages are received, a time out digit is stored in the available digits buffer and it also sets a flag to indicate that no more subsequent address messages are expected. |
| 19 | Perform a signaling sequence | Sequence number 1–255 | The parameter sequence number shall be used to index into a table containing addresses or-routines which will initiate the appropriate signaling action. In this example, no signaling actions have been identified, which needs to be provided through dial plan. This action is provided for future expansion. |
| 20 | Delay | Delay in units of 50 milliseconds 1–255 | This action initiates a timer for the duration (parameter value * 50) milliseconds. |
| 21 | Extract dial plan code from collected digits | Dial plan code 1–255 | The digits collected and stored in the digits available buffer has a dial plan code (one specified as the parameter) at the end of the digit string. The digit string is analyzed from the last digit collected. Extract the number of digits required for the dial plan code specified. |
| 22 | Set reorigination dial plan | Dial plan number 1–255 | To store the given dial plan number in the call information area in the element pointing to the dial plan number to be used for reorigination. |
| 23 | Change digit collection mode to DTMF/Dial pulse | None | This action sets a flag in the call information data maintained by digit collection/ parsing program to indicate that from the next sequence the digits are to be collected by a DTMF receiver or Dial Pulse receiver. |

TABLE 4

Error Action Examples

| ACTION NUMBER | ACTION NAME | PARAMETER VALUES | ACTION DESCRIPTION |
|---|---|---|---|
| 255 | Perform exception | Treatment number 1–99 | Store the treatment number in the call information area for error reporting. |
| 254 | Report error number | Error number 1–15 | Store the error number in the call information area and send message - digit collection failure to the trunk sequence subsystem responsible for the trunk circuit. |
| 253 | Route to operator | Operator route list 1–31 | Store the information that the call has to be routed to operator instead of the normal abort action. The abort action shall send message to route the call to translator processor The message shall indicate route to operator. The operator route |

TABLE 4-continued

Error Action Examples

| ACTION NUMBER | ACTION NAME | PARAMETER VALUES | ACTION DESCRIPTION |
|---|---|---|---|
| 252 | Abort | None | list number is also sent to the trunk sequence subsystem. End of digit collection action due to error. If DTMF/MF/R2 digit collection, then disconnect the receiver from the trunk circuit. If any tones are connected, disconnect the tone and connect silence tone (send message ES8 to connect silence tone). If call is to be routed to an operator, then send message to route the call and abandon digit collection. Send digit collection failure message to the originating trunk sequence subsystem. The error number and the exception number stored in the call information area are also sent to the originating trunk sequencing subsystem along with the other collected digits. If no error number or exception number is stored in the call information area, the digit collection status for the current dial plan code is used to generate an error number. The error numbers generated are as follows:<br>1. Time-out and no digits - if digit collection status indicates "insufficient digits" and the number of digits collected for this code is zero.<br>2. Time-out and insufficient digits - if digit collection status indicates "insufficient digits" and the number of digits collected for this code is not zero.<br>3. Illegal digit sequence and no digits - if digit collection status indicates "incorrect digits" and the number of digits collected for this code is zero.<br>4. Illegal digit sequence and insufficient digits - if digit collection status indicates "incorrect digits" and the number of digits collected for this code is not zero.<br>Abandon digit collection. |
| 14 | Wait for a digit | Digit type and digit number. Bits 7–4 store digit type and bits 3–0 store digit number. | Collect a digit. Check whether the received digit is equal to the digit specified in the parameter value. If not, continue collecting till the digit requested is received or a time out occurs. The digit collected should be stored as the next available digit and when a request for next digit is received this shall be returned as the collected digit. |
| 15 | Ignore a digit | Digit type and digit number. Bits 7–4 store digit type and bits 3–0 store digit number. | Collect a digit. Check whether the received digit is equal to the digit specified in the parameter value. If it is equal, continue collecting till the digit received is not equal to the digit specified in the parameter value or a time out occurs. The digit collected should be stored as the next available digit and when a request for next digit is received this shall be returned as the collected digit. |
| 16 | Collect digits | Number of digits | Collect the number of digits specified in the parameter value and store them in the digits available buffer. When digit collection is done through DTMF/MF/Dial Pulse/MFC-R2, if a time-out occurs, digit collection is |

TABLE 4-continued

Error Action Examples

| ACTION NUMBER | ACTION NAME | PARAMETER VALUES | ACTION DESCRIPTION |
|---|---|---|---|
| | | | stopped and the time-out digit is stored in the available digits buffer. When digit collection is done through C7 signaling, the digits are collected from the address signal parameter of the IAM message. If required number of digits are not available in the address signal parameter, and if subsequent address messages are awaited, a timer (Tadd - waiting for SAM/SAO) is started. If no subsequent address messages are received a time-out digit is stored in the available digits buffer and it also sets a flag to indicate that no more subsequent address messages are expected. |
| 17 | Collect digits till time out | No parameter | Collect digits and store them in digits available buffer till time out occurs. When digit collection is done through C7 signaling, the digits are collected from the address signal parameter of the IAM message. If required number of digits are not available in the address signal parameter, and if subsequent address messages are awaited, a timer (Tadd - waiting for SAM/SAO) is started. If no subsequent address messages are received a time-out digit is stored in the available digits buffer and it also sets a flag to indicate that no more subsequent address messages are expected. |
| 18 | Collect digits till the specified digit is received or time-out | Digit type and digit number. Bits 7–4 store digit type and bit 3–0 store digit number. | Collect all digits and store them in the digits available buffer till the digit specified is received or a time out occurs. If a time-out occurs, time-out digit is stored in the digits available buffer. |
| 18 cont'd | | | When digit collection is done through C7 signaling, the digits are collected from the address signal parameter of the IAM message. If required number of digits are not available in the address signal parameter, and if subsequenct address messages are awaited, a timer (Tadd - waiting for SAM/SAO) is started. If no subsequent address messages are received a time-out digit is stored in the available digits buffer and it also sets a flag to indicate that no more subsequent address messages are expected. |
| 19 | Perform a signaling sequence | Sequence number 1–255 | The parameter sequence number shall be used to index into a table containing addresses of routines which will initiate the appropriate signaling action. In this example, no signaling actions have been identified which need to be provided through dial plan. This action is provided for future expansion. |
| 20 | Delay | Delay in units of 50 milliseconds 1–255 | This action initiates a timer for the duration (parameter value * 50) milliseconds. |

Table 5 shows an example structure of dial plan code table 310. Dial plan code table 310 provides for a format, length, value type, digit type, and brief name for each dail plan code of a dial plan. A permissions field defines which entry within dial plan code 310 is externally programmable. Digit timer and timer digit fields store timer values and number of digits to be used when performing digit collection. For illustrative purposes, telecommunication switch 12 allows for definition of 255 dial plan codes. System defined dial plan codes range from dial plan code number 0 to dial plan code number 63. Custom define plan codes are assigned in decreasing order from dial plan code number 255 to dial plan code number 64. Certain parameters for system defined dial plan codes may be custom programmable to adjust operation of telecommunication switch 12 as desired. A number of system defined dial plan codes and their interpretation within telecommunication switch 12 are shown in Appendix A.

TABLE 5

Dial Plan Code Table

| FIELD | LENGTH | DESCRIPTION |
|---|---|---|
| Format | 1 Bit | 0 for fixed format and 1 for variable format. |
| Length | 7 Bits | Stores length of the code, can be 0 to 127. |
| Value Type | 3 Bits | Stores 0 - None, 1 - Constant, 2 - Range, 3 - Pattern and 4 - Set Value |
| Digit Type | 5 Bits | Has digit type number as shown in Fig. 10 |
| Brief Name | 32 Bits | 4 Character alphanumeric name |
| Permissions | 8 Bits | Stores whether craft can change properties. Each Bit in this element represents a field. If the values for this field is craft programmable, then the corresponding bit is set to 1. Bit numbers assigned to various fields are:<br>    0 - Format<br>    1 - Length<br>    2 - Value Type<br>    3 - Digit Type<br>    4 - Timers<br>    5 - Index Id<br>    6 - Brief Name |
| Digit Timer 1 | 4 Bits | Stores the timer value as 1 to 15 seconds, for collecting the 1st digit and subsequent digits. |
| Timer 2 Digits | 4 Bits | Stores the number of digits. When the number of digits collected equals the value stored here, the inter digit timer is changed to digit timer 2. |
| Digit Timer 2 | 4 Bits | Stores the timer value in seconds. |
| Timer 3 Digits | 4 Bits | Stores number of digits. When the number of digits collected equals the value stored here, the inter digit timer is changed to digit timer 3. |
| Digit Timer 3 | 4 Bits | Stores the timer value in seconds. |
| Set Value Table Index of System Table Id or Range Value Table Index | 12 Bits | This stores a system defined table Id or an index to a record in the set value table or range value table. The bit number 5 in the permission field determines how this value should be interpreted. 5th bit:<br>    0 - System Id table<br>    1 - a: with Code type Range, gives Range value table index id.<br>        b: with Code type Set gives Set value table index id. |

A dial plan code has a fixed or variable format with a length specified as a minimum number of digits to expect and a maximum number of digits to expect. The value type specifies how the dial plan code is recognized. A constant type indicates that the dial plan code can only have one valid value. Table 6 shows an example structure for value type-constant table 314. A range type indicates that any value within a minimum to maximum range is considered valid for the dial plan code. Table 7 shows an example structure for value-range table 316. A pattern type specifies what valid digit values can occur in each digit position. Table 8 shows an example structure for value type-pattern table 318. The set type specifies a set of valid values for recognition of the dial plan code. Table 9 shows an example structure for value type-set table 320.

TABLE 6

Value Type Constant Table

| FIELD | LENGTH | DESCRIPTION |
|---|---|---|
| Value | 64 Bits | This field stores the Constant Value |

TABLE 7

Value Type Range Table

| FIELD | LENGTH | DESCRIPTION |
|---|---|---|
| Value1 | 64 Bits | This field stores the minimum value specified in the range |
| Value2 | 64 Bits | This field stores the maximum value specified in the range |

TABLE 8

Value Type Pattern Table

| FIELD | LENGTH | DESCRIPTION |
|---|---|---|
| Pattern Value Digit Rank 1 | 16 Bits | This is a Bitmap. Each bit in this field represents a digit. If the bit corresponding to a digit is set, that digit is allowed at this digit position. |
| Pattern Value Digit Rank 2 | 16 Bits | This is a Bitmap. Each bit in this field represents a digit. It the bit corresponding to a digit is set, that digit is allowed at this digit position. |
| Pattern Value Digit Rank 3 | 16 Bits | This is a Bitmap. Each bit in this field represents a digit. If the bit corresponding to a digit is set, that digit is allowed at this digit position. |
| Pattern Value Digit Rank 4 | 16 Bits | This is a Bitmap. Each bit in this field represents a digit. If the bit corresponding to a digit is set, that digit is allowed at this digit position. |
| Pattern Value Digit Rank 5 | 16 Bits | This is a Bitmap. Each bit in this field represents a digit. If the bit corresponding to a digit is set, that digit is allowed at this digit position. |
| Pattern Value Digit Rank 6 | 16 Bits | This is a Bitmap. Each bit in this field represents a digit. If the bit corresponding to a digit is set, that digit is allowed at this digit position. |
| Pattern Value Digit Rank 7 | 16 Bits | This is a Bitmap. Each bit in this field represents a digit. If the bit corresponding to a digit is set, that digit is allowed at this digit position. |
| Pattern Value Digit Rank 8 | 16 Bits | This is a Bitmap. Each bit in this field represents a digit. If the bit corresponding to a digit is set, that digit is allowed at this digit position. |
| Pattern Value Digit Rank 9 | 16 Bits | This is a Bitmap. Each bit in this field |

TABLE 8-continued

Value Type Pattern Table

| FIELD | LENGTH | DESCRIPTION |
|---|---|---|
| | | represents a digit. If the bit corresponding to a digit is set, that digit is allowed at this digit position. |
| Pattern Value Digit Rank 10 | 16 Bits | This is a Bitmap. Each bit in this field represents a digit. If the bit corresponding to a digit is set, that digit is allowed at this digit position. |
| Pattern Value Digit Rank 11 | 16 Bits | This is a Bitmap. Each bit in this field represents a digit. If the bit corresponding to a digit is set, that digit is allowed at this digit position. |
| Pattern Value Digit Rank 12 | 16 Bits | This is a Bitmap. Each bit in this field represents a digit. If the bit corresponding to a digit is set, that digit is allowed at this digit position. |
| Pattern Value Digit Rank 13 | 16 Bits | This is a Bitmap. Each bit in this field represents a digit. If the bit corresponding to a digit is set, that digit is allowed at this digit position. |
| Pattern Value Digit Rank 14 | 16 Bits | This is a Bitmap. Each bit in this field represents a digit. If the bit corresponding to a digit is set, that digit is allowed at this digit position. |
| Pattern Value Digit Rank 15 | 16 Bits | This is a Bitmap. Each bit in this field represents a digit. If the bit corresponding to a digit is set, that digit is allowed at this digit position. |

TABLE 9

Value Type Set Table

| FIELD | LENGTH | DESCRIPTION |
|---|---|---|
| value | 16 bits | stores 4 digit value |
| pointer | 16 bits | index to next value |

The digit type field of dial plan code table 310 indicates the type of digit supported by the dial plan code. There are five major digit types—TY1, TY2, TY3, TY4, and TY5. Digit type TY1 accepts digits in the set (0, 1, 2, 3, 4, 5, 6, 7, 8, 9). These digits can be received through tones or line signals in dial pulse, DTMF, MF, R2, or address signals in common channel signaling systems. Digit type TY2 accepts digits in the set (ST, CODE 11, CODE 12, A, B, C, D, #, *). Digits A, B, C, D, #, * are received through DTMF tones (TY2-DT). CODE 11, CODE 12, and ST digits are received through address signal information in SS7/C7 call setup messages (TY2–C7). Digit type TY3 accepts digits in the set (KP, ST, ST', ST", ST'"). These digits are received through MF tones. Digit ST can also be received through address signal information in SS7/C7 call setup messages. Digit type TY4 accepts digits in the set (I-1, I-2, . . . , I-15, II-1, II-2, . . . , II-15). These digits are received through R2 tones. Digits I-1 to I-10 and II-1 to II-10 represent numerals 0–9.

Digit type TY5 defines signal information values received through call setup messages in SS7/C7/ISDN PRI signaling. Call setup messages includes—initial address message (IAM) used in signaling system number 7 and its national variance, subsequent address message (SAM) used in signaling system number 7 and its national variance, subsequent address message with one signal (SAO) used in signaling system number 7 and its national variance, and information message (IFM) used in signaling system number 7 and its national variance. Digit type TY5 has various subtypes—TY5-1 nature of address indicator values, TY5-2 nature of circuit indicator values, TY5-3 calling party category indicator values, TY5-4 incomplete calling line identity indicator values, TY5-5 signaling path indicator values, and TY5-6 numbering plan indicator values. Each subtype refers to a message parameter field in the signaling message.

For illustrative purposes, these 12 digit types are specified as recognizable by telecommunication switch 12 and are referred to by their corresponding type numbers. Table 10 shows the digit type numbers corresponding to each digit type. Table 11 show the hexadecimal values for each digit recognized by each digit type.

TABLE 10

Digit Type Number Table

| DIGIT TYPE | TYPE NUMBER | EXPLANATION |
|---|---|---|
| TY1 | 0 | Consists of digits 0 to 9 received through any signaling system or digit collection method. MFC-R2 tones I-1 to I-10 and II-1 to II-10 are also included in this type. |
| TY2-DT | 1 | Consists of DTMF digits, *,# |
| TY2-DT1 | 2 | Consists of DTMF digits, A,B,C,D |
| TY2-C7 | 3 | Consists of Code 11, Code 12 and ST received in C7 address signal parameter. |
| TY3 | 4 | Consists of MF digits. ST'", ST", ST', ST and KP |
| TY4-I | 5 | Consists of MFC-R2 digits. I-11, I-12, I-13, I-14 and I-15 |
| TY4-II | 6 | Consists of MFC-R2 digits. II-11, II-12, II-13, II-14 and II-15 |
| TY5-1 | 7 | Consists of nature of address parameter values in C7 initial address message. |
| TY5-2 | 8 | Consists of nature of circuit parameter values in C7 initial address message. |
| TY5-3 | 9 | Consists of calling party category indicator values in C7 initial address message. |
| TY5-4 | 10 | Consists of calling line identity indicator values in C7 initial address message. |
| TY5-5 | 11 | Consists of signaling path indicator values in C7 initial address message. |
| TY5-6 | 12 | Consists of numbering plan indicator values in C7 initial address message. |

TABLE 11

Digit Type Value Table

| DIGIT TYPE | DIGIT | HEXADECIMAL VALUE |
|---|---|---|
| TY1 | 1 | 01 |
| TY1 | 2 | 02 |
| TY1 | 3 | 03 |
| TY1 | 4 | 04 |
| TY1 | 5 | 05 |
| TY1 | 6 | 06 |
| TY1 | 7 | 07 |
| TY1 | 8 | 08 |
| TY1 | 9 | 09 |
| TY1 | 0 | 0A |
| TY2-DT | * | 0B |

TABLE 11-continued

Digit Type Value Table

| DIGIT TYPE | DIGIT | HEXADECIMAL VALUE |
|---|---|---|
| TY2-DT | # | 0C |
| TY2-DT | A | 0B |
| TY2-DT | B | 0C |
| TY2-DT | C | 0D |
| TY2-DT | D | 0E |
| TY2-C7 | Code 11 | 0B |
| TY2-C7 | Code 12 | 0C |
| TY2-C7 | ST | 0E |
| TY3 | ST''' | 0B |
| TY3 | ST" | 0C |
| TY3 | ST' | 0D |
| TY3 | ST | 0E |
| TY3 | KP | 0F |
| TY4-I | I-11 | 0B |
| TY4-I | I-12 | 0C |
| TY4-I | I-13 | 0D |
| TY4-I | I-14 | 0E |
| TY4-I | I-15 | 0F |
| TY4-II | II-11 | 0B |
| TY4-II | II-12 | 0C |
| TY4-II | II-13 | 0D |
| TY4-II | II-14 | 0E |
| TY4-II | II-15 | 0F |

Figure 4:
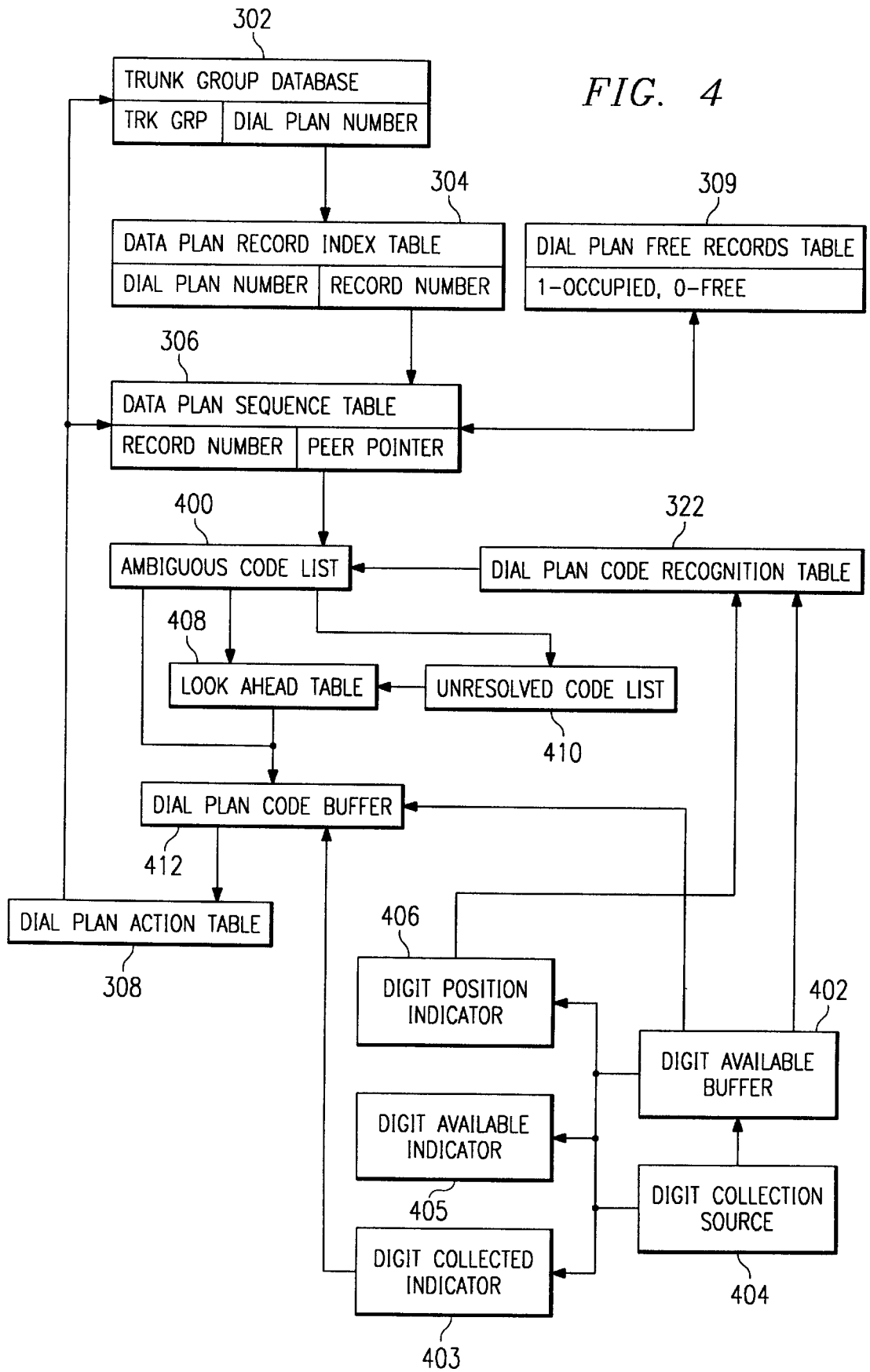
FIG. 4 illustrates a flow diagram through tables and buffers of the telecommunications switch performing a digit parsing routine.

FIG. 4 shows the interaction among various tables in dial plan database 300 for an incoming call. Telecommunication switch 12 accesses these tables during digit collection in order to determine the correct dial plan number and dial plan codes for the incoming call. When telecommunication switch 12 receives an incoming call from one of the plurality of trunk groups 14, the dial plan number associated with a particular trunk group is retrieved from trunk group database 302. The dial plan number retrieved from trunk group database 300 is used as an index to dial plan record index table 304 in order to access the first record associated with the dial plan number. The availability of the first record of the dial plan number is checked by accessing free records table 309 to determine if the record is occupied or free.

The record is accessed from dial plan sequence table 308. If the record has a null value in its next sequence pointer and peer pointer address pointers, then there is no peer list and no ambiguity to resolve. The digits to be collected belong to the dial plan code stored in this record and a code collection function is performed for this dial plan code. If an ambiguity exists, i.e., a pointer address value is stored within the peer pointer address pointer, then a list 400 of ambiguous codes is made by reading all the database records linked through the peer pointer address pointers. A code identification function is performed to resolve the ambiguity.

The code identification function is performed when the digit parsing routine being processed by telecommunication switch 12 cannot identify, unambiguously, the dial plan code for which the digits are to be collected. The code identification function collects digits in order to resolve the ambiguity. After collecting a digit, the code identification function refers to dial plan code recognition table 322. An available digit buffer 402 holds digits collected by a digit collection source 404. A digit position indicator 406 keeps track of the position each digit occupies. A digit collected indicator 403 keeps track of the number of digits collected by digit collection source 404 and a digit available indicator 405 keeps track of the number of digits within digit available buffer 402. The digit collected, the digit position, and the digit type are used as parameters to access a bit map of dial plan codes within dial plan recognition table 40. If a bit corresponding to a dial plan code is set in this bit map, that dial plan code allows the collected digit at that current digit position. If the bit corresponding to a dial plan code in ambiguous code list 400 is not set in the bit map, this dial plan code is removed from ambiguous code list 400.

The code identification function collects digits and eliminates dial plan codes from ambiguous code list 38 in response to the bit mapping of dial plan code recognition table 40 until one of the following cases occurs ambiguous code list 38 is empty, ambiguous code list 38 has one code, or ambiguous code list 38 has more than one code. If ambiguous code list 38 is empty, unexpected digits have been collected and a digit collection error is reported. If ambiguous code list 400 has one code, the code identification function was successful in identifying a dial plan code. This dial plan code is returned in order to perform the code collection function for this dial plan code.

If ambiguous code list 400 still contains more than one code, the dial plan codes remaining either have a length equal to or greater than the number of digits collected thus far. If there are dial plan codes with length equal to the number of digits collected, the next digit collected does not belong to these dial plan codes but may belong to the next sequence in the dial plan corresponding to these dial plan codes. This occurs when the next digit does not belong to the remaining dial plan codes in ambiguous code list 400. An example of resolving this ambiguity is illustrated in Table 12.

TABLE 12

Ambiguous dial plan codes.

| Dial Plan Code Number | Code Name | Code Length | Code Value |
|---|---|---|---|
| 16 | IPC | 3 | [0] [1] [1] |
| 255 | INT01 | 2 | [0] [1] |
| 254 | ZPLUS | 1 | [0] |

For a zero collected as the first digit, all the dial plan codes in Table 1 permit this digit at digit position 1. Since dial plan code 254 (ZPLUS) is of length 1 and the number of digits collected is 1, the next digit does not belong to ZPLUS. However, the digit parsing routine cannot eliminate ZPLUS at this stage because this ambiguity can be resolved only after collecting one more digit and confirming that the next digit is 1. If the next digit is 1, then ZPLUS is no longer considered and eliminated from ambiguous code list 400. If the next digit is not 1, then the digit parsing routine assumes that the digits collected so far belong to the dialing sequence starting with dial plan code ZPLUS and returns the identified dial plan code as ZPLUS.

A similar situation will arise after collecting two digits 0 and 1. An ambiguity will now exist between dial plan code 255 (INT01) and dial plan code 16 (IPC). The dial plan code which requires to be confirmed after collecting the next digit is stored in a look ahead table 408, wherein dial plan code 255 (INT01) is placed. Only one dial plan code can be placed in look ahead table 408, but there may be a possibility that ambiguous code list 400 may have more than one dial plan code competing for resolution by look ahead analysis. Codes competing for look ahead analysis are placed into an unresolved code list 410. To break the tie, the dial plan code competing for placement in look ahead table 408 having a constant type value definition is considered first. If there are no codes with a constant type value definition, the set value tables for the dial plan codes are checked to see whether the digits received are present. If the digit string is not present in any of the set value tables, then these dial plan codes are deleted from ambiguous code list 400. If more than one dial plan code is still competing for placement in look ahead table 408, then the dial plan has conflicting codes and cannot be processed. A digit collection error result is returned.

The code identification function either identifies a dial plan code as recognized or returns a digit collection error. A digit collection error causes error actions to be performed in response to the inability to identify a dial plan code. Digit collection begins upon identifying a dial plan code. Digit collection occurs by placing digits collected by digit collection source 404 into available digits buffer 402. Digits from available digits buffer 402 are moved to a dial plan code buffer 412 corresponding to the identified dial plan code. Dial plan code buffer 412 initiates performance of valid actions associated with the identified dial plan code within dial plan action table 308. After successfully performing the valid actions, telecommunications switch 12 begins the digit parsing routine again for the next dial plan code in the dialing sequence or the next dial plan number.

The processing flow for the digit parsing routine performed by telecommunications switch 12 begins at process block 500 in FIG. 5. Telecommunications switch 12 receives an incoming call over a trunk group 14 at process block 502 and obtains the dial plan number corresponding to the incoming trunk group 14 at process block 504. The first record corresponding to the dial plan number is accessed at process block 506 and the contents of its peer pointer is checked at process block 508. If there is no peer list associated with the first record of the dial plan, process flow proceeds to the code collection function at process block 700. If a peer list exists, the dial plan codes in the peer list are placed into the ambiguous code list at process block and process flow proceeds to the code identification function at process block 600.

FIGS. 6A–D show the process flow for the code identification function beginning at process block 600. At process block 602, the digit position indicator is set to zero and look ahead table is set to null. Digit timer 1 of the first dial plan code in the ambiguous code list is set at process block 604. Digit timer 1 begins counting during collection of the next digit at process block 606. The next digit is stored in the available digit buffer at process block 608. A check is made at process block 610 to see whether digit timer 1 timed out before the next digit was received or that an unacceptable digit was encountered. If so, process flow proceeds to the resolve conflict function at process block 800.

If an acceptable digit has been received, the index value is computed from the digit collected, its position, and its digit type at process block 612. The digit position indicator is incremented at process block 614 and the dial plan code recognition table is accessed at process block 616 in response to the index value. The indexed bit map found in the dial plan recognition table is compared to the dial plan codes within the ambiguous code list at process block 618. Dial plan codes are deleted from the ambiguous code list at process block 620 that do not have its bit set in the indexed bit map of the dial plan code recognition table.

Process flow proceeds to process block 622, where the contents of the ambiguous code list is examined. If the ambiguous code list is empty, the look ahead table is examined at process block 624. If the look ahead table is not empty, the dial plan code in the look ahead table is returned at process block 626 and process flow proceeds to the code collection function at process block 700. If the look ahead table was empty, then a digit collection error is returned at process block 628 in FIG. 6B and error actions are performed at process block 900 to include aborting the incoming call.

If the ambiguous code list was not empty at process block 622, then the look ahead table is set to null at process block 630 and the content of the ambiguous code list is examined at process block 632. If the ambiguous code list has only one entry, the one dial plan code in the ambiguous code list is returned at process block 634 and process flow proceeds to the code collection function at process block 700. If the ambiguous code list has more than one entry, the dial plan codes having defined lengths equal to the number of digits collected are placed into the unresolved code list at process block 636 in FIG. 6B. If the unresolved code list is empty at process block 638, then the contents of the ambiguous code list and the look ahead table are examined at process block 640. If both are empty, then a digit collection error is returned at process block 628 and error actions are performed at process block 900. If either the ambiguous code list or the look ahead table are not empty, process flow proceeds through jump point A to FIG. 6A if the number of digits collected at process block 642 is less than a predefined number (in this example 15). Otherwise, process flow proceeds through jump point D to FIG. 6C. If the unresolved code list has only one entry at process block 644, the entry is stored in the look ahead table at process block 646 at process flow proceeds through process block 640 as described above.

If there is more than one entry in the unresolved code list competing for look ahead analysis, the value types of the dial plan codes in the unresolved code list are analyzed. If any entry has a valid type-constant at process block 648, those entries are retained in and other entries are eliminated from the unresolved code list at process block 650. If only one entry remains in the unresolved code list at process block 652, that entry is stored in the look ahead table at process block 654 and process flow proceeds to jump point B back to process block 640 of FIG. 6B. If no entry has value type-constant but any entry has value type-set at process block 656, those entries with value type-set are retained in the unresolved code list and other entries are eliminated therefrom at process block 658. The content of the unresolved code list is checked at process block 652 as discussed above. If no entry has value type-set but any entry has value type-range at process block 660, entries with value type-range are retained in the unresolved code list and other entries are eliminated therefrom at process block 662. The content of the unresolved code list is checked at process block 652 as discussed above.

If the unresolved code list has more than one entry at process block 652 after the elimination process, the value tables of the remaining entries are compared at process block 664. If the value table comparison resolves the conflict at process block 666, then the resulting entry is stored in the look ahead table at process block 668 and process flow proceeds through jump point B. If the conflict cannot be resolved, a dial plan error is returned at process block 670 and error actions are performed at process block 672.

Figure 6A:
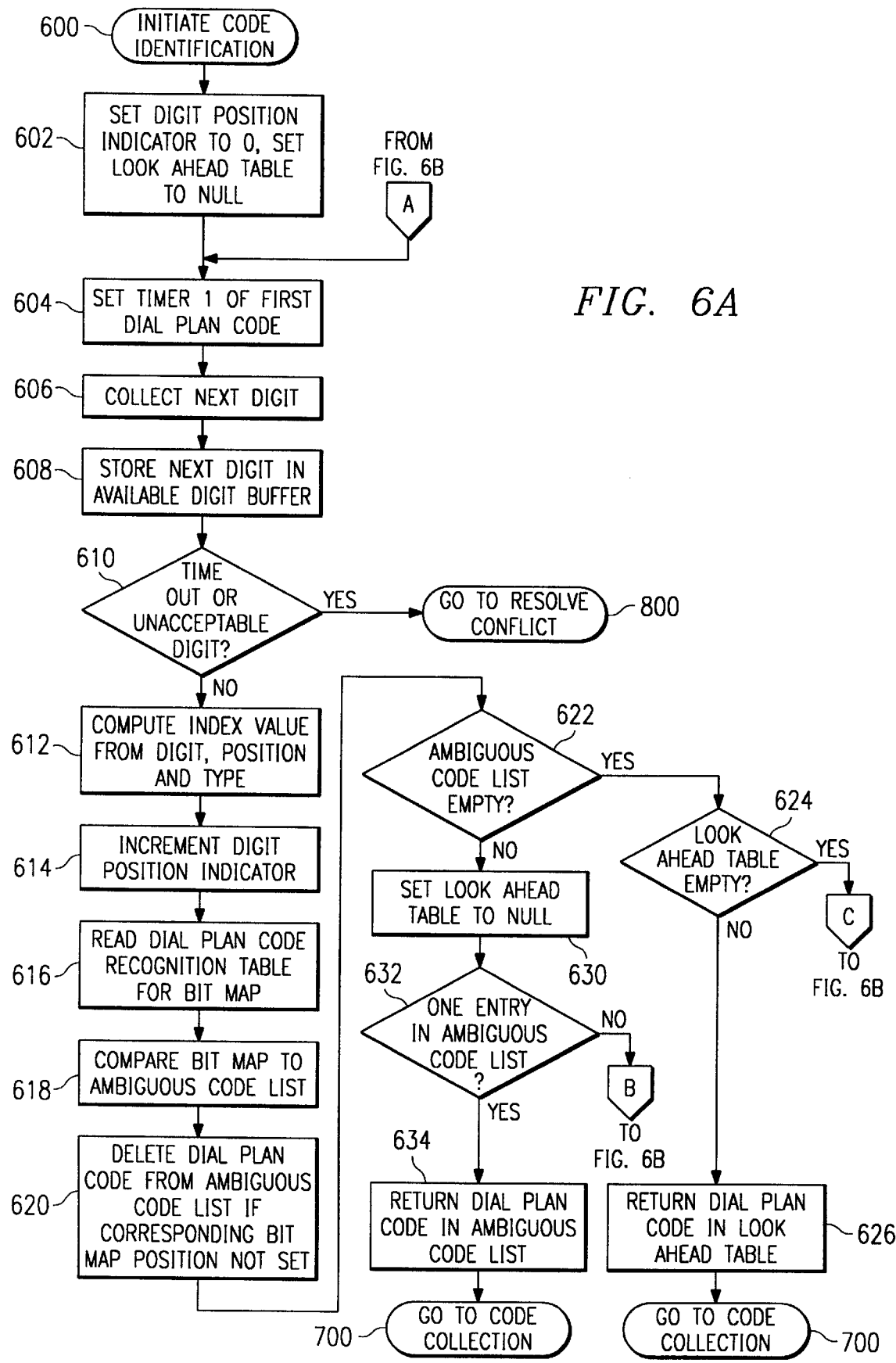
FIGS. 6A–D illustrate a flow diagram of a code identification function for the digit parsing routine.
Figure 6B:
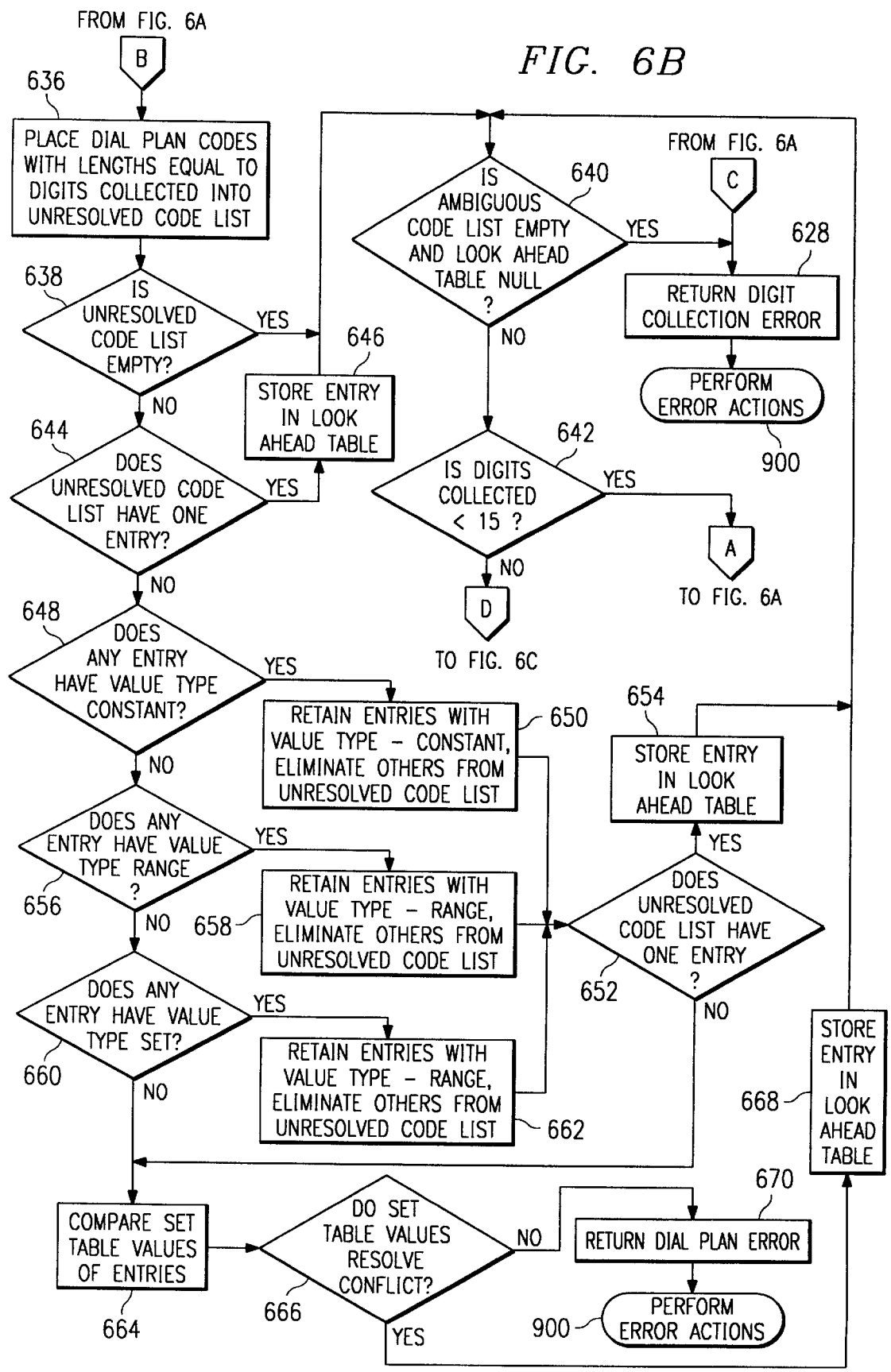
Figure 6C:
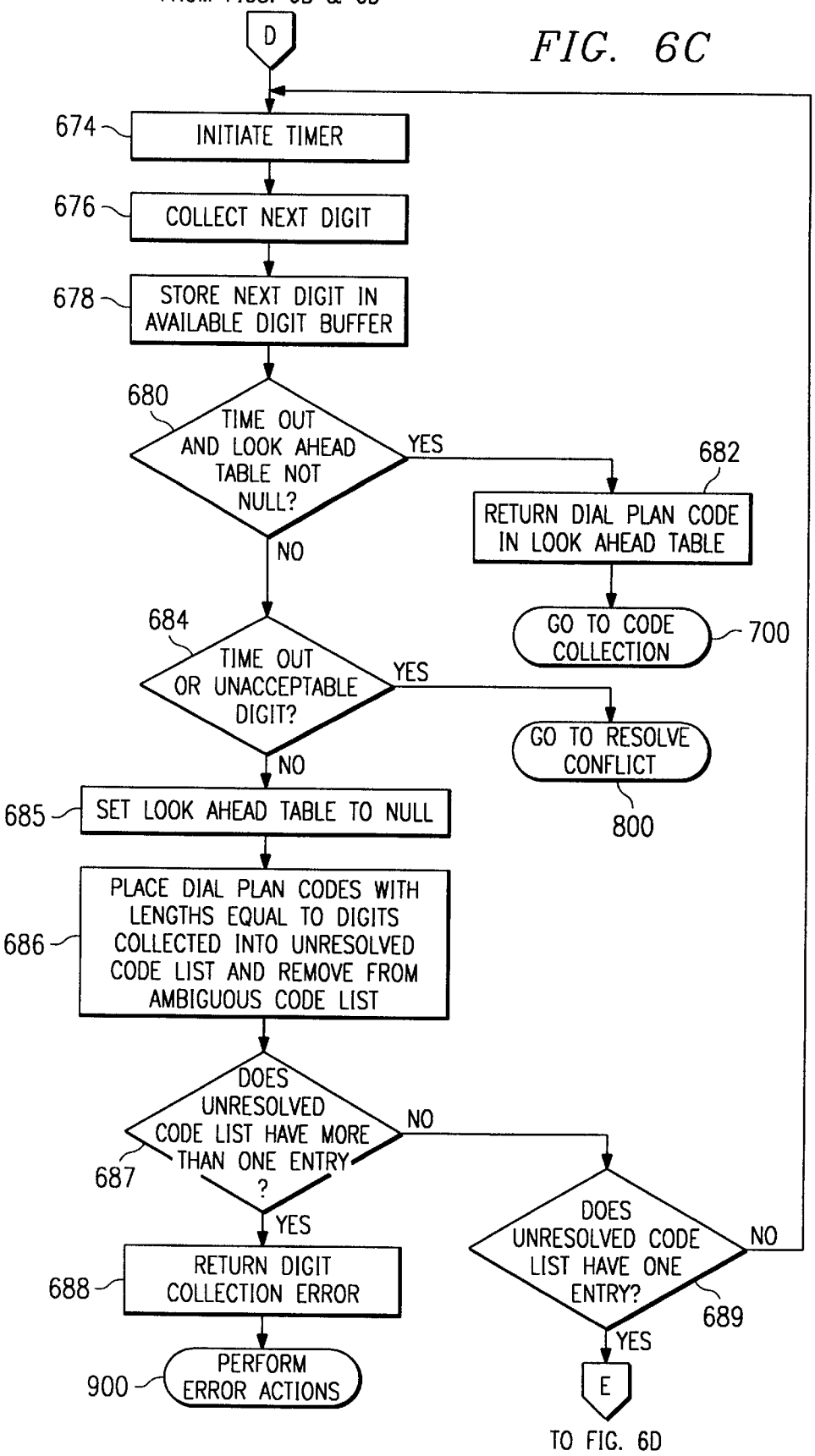

FIG. 6C shows the process flow associated with jump point D. Jump point D is reached when the number of digits collected is greater than or equal to a predefined number (15, in this example). At jump point D, a digit timer of the first dial plan in the ambiguous code list is initiated at process block 674 and the next digit is collected at process block 676 and stored in the available digit buffer at process block 678. If a digit timer time-out has occurred and look ahead table has an entry at process block 680, then the dial plan code in the look ahead table is returned at process block 682 and process flow proceed to the code collection function at process block 700. If not, process block 684 determines if a time-out or an unacceptable digit has been received. If so, process flow proceeds to the resolve conflict function at process block 800. Otherwise, the look ahead table is set to null at process block 685 and dial plan codes with lengths equal to the number of digits collected are removed from the ambiguous code list and placed into the unresolved code list at process block 686. If the unresolved code list has more than one entry at process block 687, then a digit collection error is returned at process block 688 and error actions are performed at process block 900. If the unresolved code list has less than one entry at process block 689, process flow proceeds to jump point D.

Figure 6D:
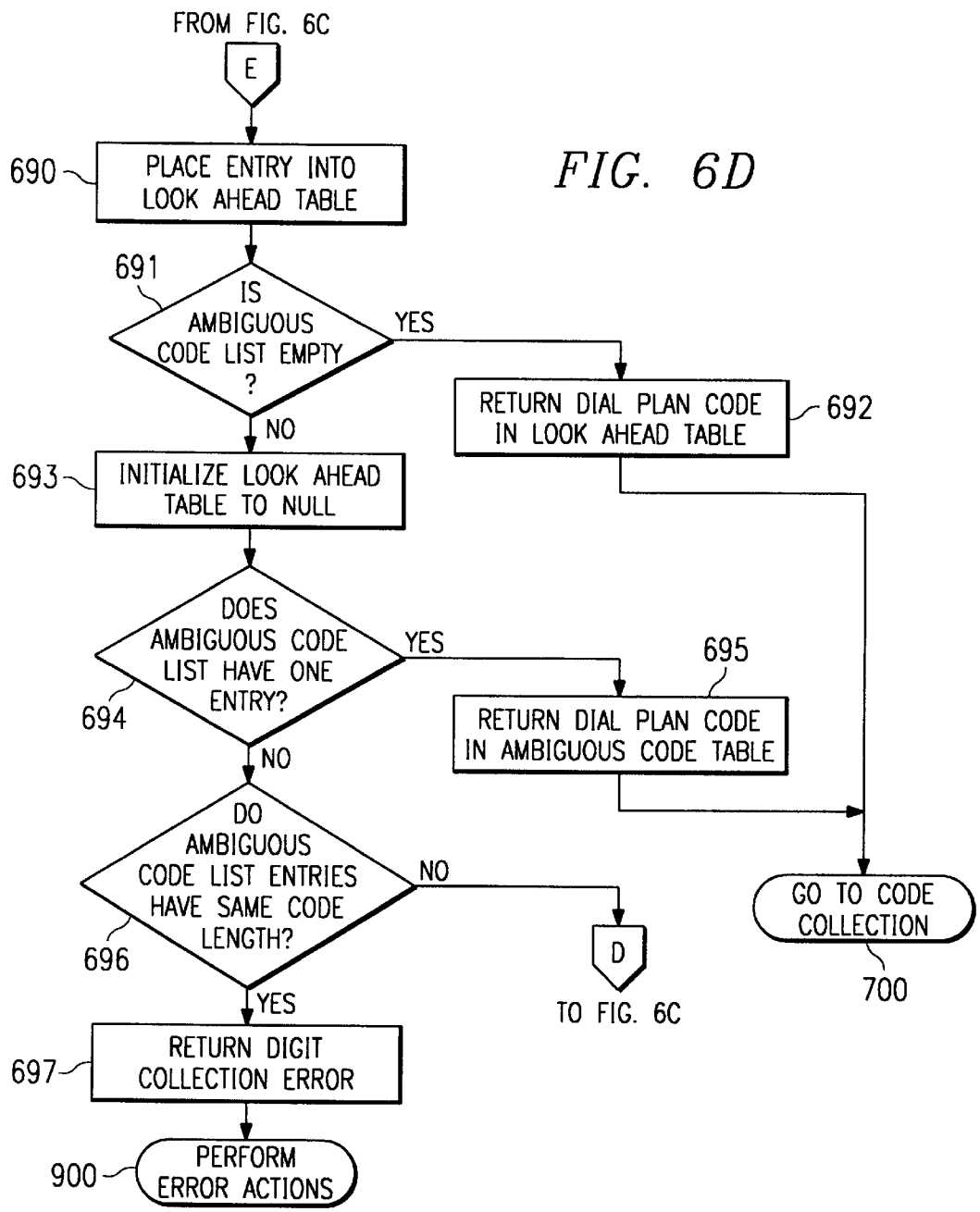

Process flow proceeds to FIG. 6D where if only one entry is in the unresolved code list at process block 689, the entry is placed into the look ahead table at process block 690. If the ambiguous code list is empty at process block 691, the dial plan code in the look ahead table is returned at process block 692 and process flow proceeds to the code collection function at process block 700. If the ambiguous code list is not empty, the look ahead table is set to null at process block 693. If the ambiguous code list has only one entry at process block 694, the entry is returned at process block 695 and process proceeds to the code collection function at process block 700. If the ambiguous code list is not empty and the entries have the same length at process block 696, the conflict cannot be resolved and a digit collection error is returned at process block 697 followed by performance of error actions at process block 900. For entries of different lengths, process flow proceeds through jump point D to FIG. 6C.

FIG. 7 shows the process flow for the resolve conflict function of the digit parsing routine. The resolve conflict function is initiated at process block 800 when a time-out or unacceptable digit has been received in the code identification function. Process flow proceeds to process block 802, in order to check the content of the look ahead table. If the look ahead table has an entry, that entry is returned at process block 804 and process flow proceeds to the code collection function at process block 700. If the look ahead table is null, dial plan codes having a fixed format are removed from the ambiguous code list of process block 806. If the ambiguous code list is empty at process block 808, then a digit collection error is returned at process block 810 and error actions are performed at process block 900. If the ambiguous code list is not empty, dial plan codes having a minimum number of expected digits greater than the number of digits collected are removed from the ambiguous code list at process block 812. If the ambiguous code list is empty at process block 814, a digit collection error is returned at process block 810 and error actions are performed at process block 900. If the ambiguous code list is not empty, the first dial plan code in the ambiguous code list is returned at process block 816 and process flow proceeds to the code collection function at process block 700.

Figure 8A:
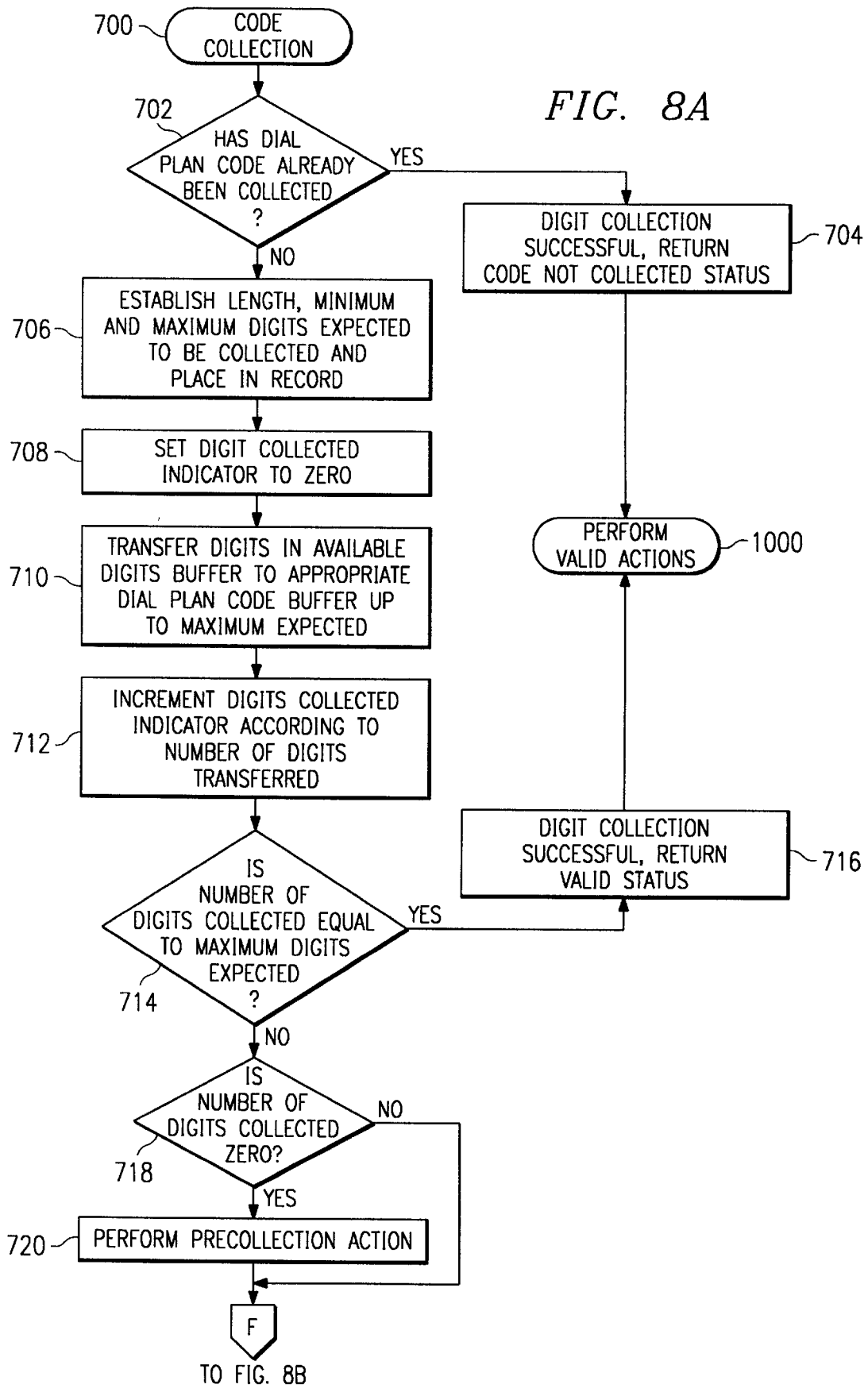
FIGS. 8A–B illustrate a flow diagram of a code collection function for the digit parsing routine.
Figure 8B:
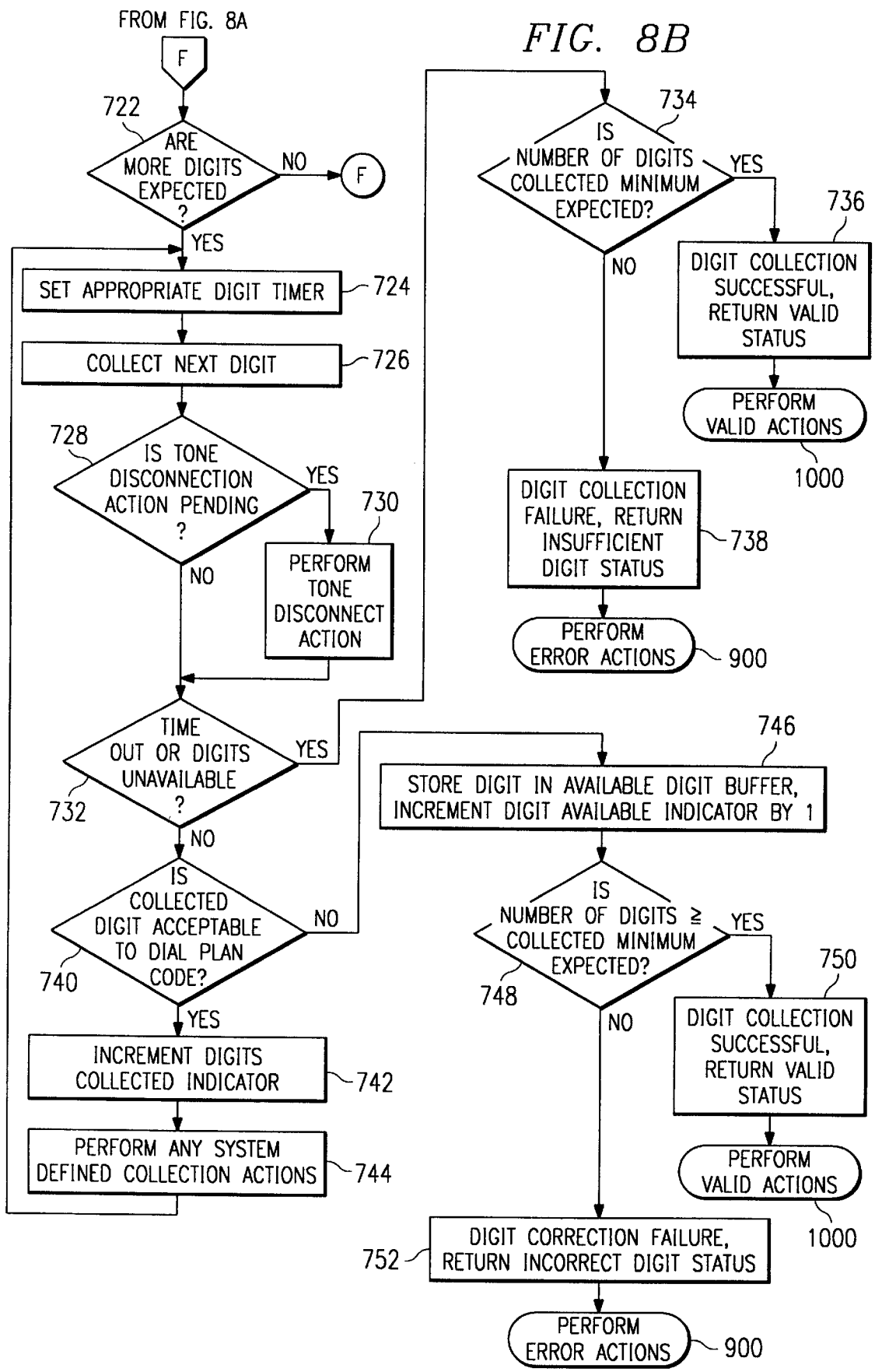

FIGS. 8A–B show the process flow for the code collection function of the digit parsing routine beginning at process block 700. In FIG. 8A, process flow proceeds to process block 702 where a check is made to determine if the digits for a dial plan code have already been collected. Digits for a dial plan code may have been collected during the code identification function. If so, a digit collection successful and code not collected status are returned at process block 704 and valid actions are performed at process block 1000. Valid actions include initiate routing of the call, processing another dial plan, and continue with the current dialing sequence. Digits for the dial plan code are placed in the corresponding dial plan code buffer used to access the associated valid actions.

If the dial plan code has not been collected, the length and minimum and maximum expected digits are established at process block 706 and the digit collected indicator is set to zero at process block 708. Any digits within the available digits buffer are transferred at process block 710 tot he corresponding dial plan code buffer up to the maximum number expected. The digit collected indicator is incremented at process block 712 for each digit transferred. If the number of digits collected so far equals the maximum number expected at process block 714, a digit collection successful and valid status are returned at process block 716 and appropriate valid actions are performed at process block 1000. If the maximum number of digits expected has not been reached, a determination is made whether any digits have been collected, precollection valid actions are performed at process block 720, such as connecting a tone prior to proceeding.

After precollection actions are performed or if there has been at least one digit previously collected, process flow proceeds to FIG. 8B to determine if more digits are expected at process block 722. If more digits are expected, the appropriate digit timer in the record of the identified dial plan code is set at process block 724 and the next digit is collected at process block 726. If a tone disconnection action is pending at process block 728, a tone disconnection action is performed at process block 730 before proceeding. If a time-out occurs or digits are unavailable at process block 732, a determination is made at process block 732 as to whether the minimum expected number of digits have been collected. If so, a digit collection successful and valid status are returned at process block 736 and valid actions are performed at process block 1000. If not, a digit collection failure and insufficient digit status are returned at process block 738 and error actions are performed at process block 900.

If a digit was collected at process block 732, a check is made at process block 740 to see if the collected digit is acceptable to the identified dial plan code. If so, the digit collected indicator is incremented at process block 742 and any defined system collection actions are performed at process block 744 in preparation for collecting the next digit beginning back at process block 724. If the collected digit is not acceptable to the dial plan code, the collected digit is stored in the available digit buffer at process block 746 and the digit available indicator is incremented by 1. Process flow proceeds to process block 748 where the number of digits collected is compared to the minimum number expected. If collected digits are greater than the minimum expected, than a digit collection successful and valid status are returned at process block 750 and valid actions are performed at process block 1000. If collected digits are less than the minimum expected, a digit collection failure and incorrect digit status are returned at process block 752 and error actions are performed at process block 900.

Figure 9:
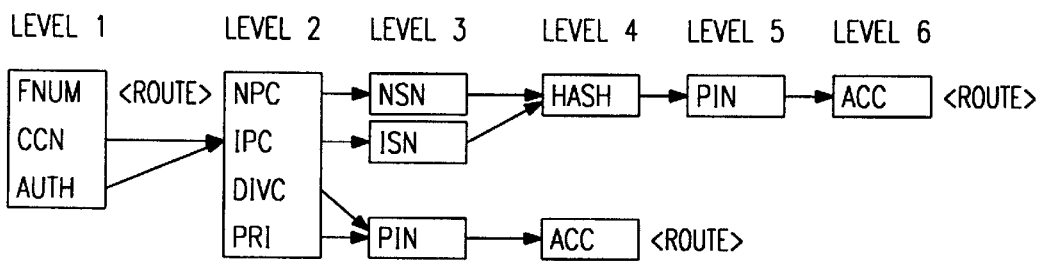
FIG. 9 illustrates a block diagram for a created dial plan.

Creation, alteration, and deletion of dial plans, dial plan codes, and associated parameters may be performed through craft terminal 201. When initiated, craft terminal 201 provides command line prompts used to interrogate an operator for desired inputs associated with a dial plan. Each input is subject to validation upon entry in order to verify that proper inputs have been received and that parameters satisfy predefined constraints. Any entry errors will result in a command line prompt requesting entry of a correct input. An example of a dial plan is shown in FIG. 9 and a corresponding creation sequence is shown in Table 13. Though shown as requiring entries through command line prompting, craft terminal 201 and telecommunications switch 12 may employ a graphical user interface to provide point and click capability in the creation of a dial plan.

TABLE 13

Creating a Dial Plan

| MMI PROMPT | CRAFT INPUT | COMMENTS |
|---|---|---|
|  | CHANGE UP DLPLAN | To start creating a new dial plan. |
| DIAL PLAN NUMBER | 17 | Enter a new dial plan number. |
| 2567 records free |  | Displays the space available and shows the cluster number and level number. |
| BUILD CLUSTER 1 IN LEVEL 1 |  |  |
| DIAL PLAN CODE NAME: | FNUM | To enter Free Phone Number as a node in the cluster |
| BRANCH NUMBER | 0 | A branch number of zero indicates there are no branches from FNUM and routing will begin. |
| MINIMUM LENGTH | 6 | To set minimum number of digits required to be collected. |
| MAXIMUM LENGTH | 8 | To set maximum number of digits required to be collected. |
| ACTION NUMBER | V5 | To enter valid action as continue next sequence. |
| ACTION NUMBER | E255,2 | To return treatment 2 when a digit collect error occurs. |
| ACTION NUMBER | E252 | To abort digit collection. |
| ACTION NUMBER | / | To end the action entry sequence. |
| DIAL PLAN CODE NAME: | CCN | To enter Calling Card Number as a node in the cluster. |
| BRANCH NUMBER | 1 | To assign branch number. |
| ACTION NUMBER | V5 | To enter valid action as continue next sequence. |
| ACTION NUMBER | E255,1 | To return treatment 1 when a digit collect error occurs |
| ACTION NUMBER | E252 | To abort digit collection. |
| ACTION NUMBER | / | To end the action entry sequence. |
| DIAL PLAN CODE NAME: | AUTH | To enter Authorization code as a node in the cluster. |
| BRANCH NUMBER | 1 | To assign branch number. |
| ACTION NUMBER | V5 | To enter valid action as continue next sequence. |
| ACTION NUMBER | E253,4 | To route to operator route list 4 when a digit collection error occurs. |
| ACTION NUMBER | E252 | To abort digit collection. |
| ACTION NUMBER | / | To end the action entry sequence. |

TABLE 13-continued

Creating a Dial Plan

| MMI PROMPT | CRAFT INPUT | COMMENTS |
|---|---|---|
| DIAL PLAN CODE NAME: | / | To end adding nodes to cluster 1, level 1 |
| Build Cluster 1 in Level 2 |  | To inform craft the cluster and level number for which the prompts are being issued. |
| DIAL PLAN CODE NAME: | NPC | To enter National Prefix Code as a node in the cluster. |
| BRANCH NUMBER | 1 | To assign branch number 1. |
| MINIMUM LENGTH | 1 | To set minimum number of digits required to be collected. |
| MAXIMUM LENGTH | 1 | To set maximum number of digits required to be collected. |
| ACTION NUMBER | V5 | To enter valid action as continue next sequence. |
| ACTION NUMBER | E255,3 | To return treatment 3 when a digit collect error occurs. |
| ACTION NUMBER | E252 | To abort digit collection. |
| ACTION NUMBER | / | To end the action entry sequence. |
| DIAL PLAN CODE NAME: | IPC | To enter International Prefix Code as a node in the cluster. |
| BRANCH NUMBER | 2 | To assign branch number 2. |
| MINIMUM LENGTH | 3 | To set minimum number of digits required to be collected. |
| MAXIMUM LENGTH | 3 | To set minimum number of digits required to be collected. |
| ACTION NUMBER | V5 | To enter valid action as continue next sequence. |
| ACTION NUMBER | E255,3 | To return treatment 3 when a digit collect error occurs |
| ACTION NUMBER | E252 | To abort digit collection. |
| ACTION NUMBER | / | To end the action entry sequence. |
| DIAL PLAN CODE NAME: | DIVC | To enter Private Network as a node in the cluster. |
| BRANCH NUMBER | 3 | To assign branch number. |
| ACTION NUMBER | V5 | To enter valid action as continue next sequence. |
| ACTION NUMBER | E255,3 | To return treatment 3 when a digit collect error occurs. |
| ACTION NUMBER | E252 | To abort digit collection. |
| ACTION NUMBER | / | To end the action entry sequence. |
| DIAL PLAN CODE NAME: | PRI | To enter Private Speed Number as a node in the cluster. |
| BRANCH NUMBER | 3 | To assign branch number 3. |

TABLE 13-continued

Creating a Dial Plan

| MMI PROMPT | CRAFT INPUT | COMMENTS |
|---|---|---|
| MINIMUM LENGTH | 2 | To set minimum number of digits required to be collected as 2. |
| MAXIMUM LENGTH | 4 | To set maximum number of digits required to be collected as 4. |
| ACTION NUMBER | V5 | To enter valid action as continue next sequence. |
| ACTION NUMBER | E255,3 | To return treatment 3 when a digit collect error occurs. |
| ACTION NUMBER | E252 | To abort digit collection. |
| ACTION NUMBER | / | To end the action entry sequence. |
| DIAL PLAN CODE NAME: | / | To end adding nodes to cluster 1, level 2 |
| Build Cluster 1 in Level 3 | | |
| DIAL PLAN CODE NAME: | NSN | To enter NSN as a node in the cluster. |
| BRANCH NUMBER | 1 | To assign branch number. |
| MINIMUM LENGTH | 3 | To set minimum number of digits required to be collected. |
| MAXIMUM LENGTH | 6 | To set maximum number of digits required to be collected. |
| ACTION NUMBER | V5 | To enter valid action as continue next sequence. |
| ACTION NUMBER | E255,1 | To return treatment 1 when a digit collect error occurs. |
| ACTION NUMBER | E252 | To abort digit collection. |
| ACTION NUMBER | / | To end the action entry sequence. |
| DIAL PLAN CODE NAME: | / | To end adding nodes to cluster 1, level 3 |
| Build Cluster 2 in Level 3 | | |
| DIAL PLAN CODE NAME: | ISN | To enter ISN as a node in the cluster. |
| BRANCH NUMBER | 1 | To assign branch number to ISN |
| MINIMUM LENGTH | 3 | To set minimum number of digits required to be collected. |
| MAXIMUM LENGTH | 4 | To set maximum number of digits required to be collected. |
| ACTION NUMBER | V5 | To enter valid action as continue next sequence. |
| ACTION NUMBER | E255,1 | To return treatment 1 when a digit collect error occurs. |
| ACTION NUMBER | E252 | To abort digit collection. |
| ACTION NUMBER | / | To end the action entry sequence. |
| DIAL PLAN CODE NAME: | / | To end adding nodes to cluster 2, level 3 |
| Build Cluster 3 in Level 3 | | To inform craft the cluster and level number for which the prompts are being issued. |
| DIAL PLAN CODE NAME: | PIN | To enter Personal Identification as a node in the cluster. |
| BRANCH NUMBER | 2 | To assign branch number. |
| MINIMUM LENGTH | 2 | To set minimum number of digits required to be collected as 2. |
| MAXIMUM LENGTH | 3 | To set maximum number of digits required to be collected. |
| ACTION NUMBER | V5 | To enter valid action as continue next sequence. |
| ACTION NUMBER | E255,1 | To return treatment 1 when a digit collect error occurs. |
| ACTION NUMBER | E252 | To abort digit collection. |
| ACTION NUMBER | / | To end the action entry sequence. |
| DIAL PLAN CODE NAME: | / | To end adding nodes to cluster 3, level 3 |
| Build Cluster 1 in Level 4 | | To inform craft the cluster and level number for which the prompts are being issued. |
| DIAL PLAN CODE NAME: | HASH | To enter HASH as a node in the cluster. |
| BRANCH NUMBER | 1 | To assign branch number 1. |
| ACTION NUMBER | V5 | To enter valid action as continue next sequence. |
| ACTION NUMBER | E254,1 | To report digit collection error. |
| ACTION NUMBER | 252 | To abort digit collection. |
| ACTION NUMBER | / | To end the action entry sequence. |
| ACTION NUMBER | / | To end adding nodes to cluster 1, level 4. |
| Build Cluster 2 in Level 4 | | |
| DIAL PLAN CODE NAME: | ACC | To enter ACC as a node in the cluster. |
| BRANCH NUMBER | 0 | To indicate no branches from ACC. |
| ACTION NUMBER | V7 | To validate account code. |
| ACTION NUMBER | V8 | To enter valid action as "route the call." |
| ACTION NUMBER | E254,1 | To report digit collection error. |
| ACTION NUMBER | E252 | To abort digit collection. |
| ACTION NUMBER | / | To end the action entry sequence. |
| DIAL PLAN CODE NAME: | / | To end adding nodes to cluster 1, level 4. |
| Build Cluster 1 in Level 5 | | To inform craft the cluster and level number for which the prompts are being issued. |
| DIAL PLAN CODE NAME: | PIN | To enter PIN as a node in the cluster. |

TABLE 13-continued

Creating a Dial Plan

| MMI PROMPT | CRAFT INPUT | COMMENTS |
| --- | --- | --- |
| BRANCH NUMBER | 1 | To indicate 1 branch. |
| MINIMUM LENGTH | 2 | To set minimum number of digits required to be collected. |
| MAXIMUM LENGTH | 3 | To set maximum number of digits required to be collected. |
| ACTION NUMBER | V5 | To enter valid action as continue next sequence. |
| ACTION NUMBER | E255,1 | To return treatment 1 when a digit collect error occurs. |
| ACTION NUMBER | E252 | To abort digit collection. |
| ACTION NUMBER | / | To end the action entry sequence. |
| DIAL PLAN CODE NAME: | / | To end adding nodes to cluster 1, level 5. |
| Build Cluster 1 in Level 6 | | To inform craft the cluster and level number for which the prompt are being issued. |
| DIAL PLAN CODE NAME: | ACC | To enter ACC as a node in the cluster. |
| BRANCH NUMBER | 0 | To indicate no branches from ACC. |
| ACTION NUMBER | V7 | To validate account code. |
| ACTION NUMBER | V8 | To enter a valid action as "route the call" |
| ACTION NUMBER | E254,1 | To report digit collection error. |
| ACTION NUMBER | E252 | To abort digit collection. |
| ACTION NUMBER | / | To end the action entry sequence. |
| DIAL PLAN CODE NAME: | / | To end adding nodes to cluster. |
| CONFIRM DIAL PLAN?: | Y | To confirm the end of dial plan and save it. |
| DIAL PLAN NUMBER: | <CTRL>A | To end the MMI session. |

Not only are validations performed for each input entered into craft terminal 201, integrity validations are performed on the dialing plan, and sequences being created. Integrity validations are performed whenever a dial plan code or node of a dial plan tree is entered into dial plan database 300. Once a node has been accepted, cluster branch, and sequence dependent constraints are imposed to insure integrity of the dial plan. Validations carried out on a node insure that dial plan codes not listed in the dial plan code table are not allowed as an entry and that all action numbers and parameters fall within appropriate constraints associated with the corresponding dial plan code.

To perform validations of nodes within a cluster, the primary criterion is to ensure that a given dial plan code in the cluster is distinguishable from other dial codes within the cluster. Thus, no dial plan codes should be repeated within a cluster unless the same dial plan codes have different lengths. Further, dial plan codes with similar properties cannot form part of a cluster. There should be some difference in either digit type, value type, or format to have a valid dial plan.

If the format of the new dial plan code is of fixed length, the length of the dial plan code must be different than either the length of the other fixed length dial plan codes in the cluster, lesser than the lowest minimum length of the variable length dial plan codes, or greater than the highest maximum length of the variable length dial plan codes. Of the new dial plan code having a value-type range, the values should not overlap the values of other dial plan codes within the cluster unless different lengths are specified. The values of the new dial plan code having set or constant value types should be different from constant or set values of other dial plan codes in the cluster. The nth digit of dial plan codes having value type-pattern should be different from the nth digit of other dial plan codes in the cluster.

If the new dial plan code format is variable, either its minimum length should be greater than the longest length of the dial plan codes having fixed length formats, or its maximum length should be lesser than the shortest length of the dial plan codes having fixed length formats. Validation may also occur if either its minimum length is greater than the largest maximum length of the dial plan codes having variable length formats or its maximum length is less than the shortest length of the dial plan codes having variable length formats. For value type-pattern, the digits allowed at any position within the least of the minimum ranges of the competing dial plan codes should be mutually exclusive.

To perform validations of nodes on a branch, the primary criterion is to ensure that the start of a dial plan code is distinguishable as a branch by differing in digit type, value type, or format. No restrictions apply to dial plan codes in a level of the dial plan tree that tie to dial plan codes in the parent branch having a fixed format. There is also no restrictions on a dial plan code in a branch where the dial plan codes in the parent branch are distinguishable by their properties. If at least one dial plan code in the parent branch has a variable format, the first digit of the next dial plan code in the branch should not occur in any dial plan code in the parent branch.

Certain dial plan codes may not be effective with other dial plan codes, thus validations are performed on dialing sequences created within a dial plan. The use of certain dial plan codes logically prevents the ability to place other dial plan codes in the dialing sequence. For example, only one billing type dial plan code (such as Calling Card Number, Credit Card Number, or Debit Card Number) can occur in a dialing sequence. Another example may be that only one of the following dial plan codes may occur within a dialing sequence—ENUM, NCN, SNUM, PRI, PUB, and DLVC. Telecommunications switch 12 ensures that dialing sequences have valid integrity before allowing a call to be passed on. Table 14 shows an example of what dial plan codes would not be allowed for certain dial plan codes that have been identified by the digit parsing routine as part of a dialing sequence.

TABLE 14

Disallowed Dial Plan Codes in a Dialing Sequence
DLPCs

| IPC | ISN | CC | NPC | TC | IRC | NRC | EC | SUBN | STN | NSN |
|---|---|---|---|---|---|---|---|---|---|---|
| NPC | CC | ISN | ISN | NRC | TC | TC | SUBN | STN | SUBN | SUBN |
| ENUM | IRC | IRC | IRC | NSN | EC | EC | NRC | NRC | NRC | NRC |
| NCN | NPC | NPC | NPC | ISN | NRC | NRC | NSN | NSN | NSN | NSN |
| SNUM | ENUM | ENUM | ENUM | IRC | NSN | NSN | ISN | ISN | ISN | ISN |
| PRI | NCN | NCN | NCN | NPC | ISN | ISN | IRC | IRC | IRC | IRC |
| PUB | SNUM | SNUM | SNUM | ENUM | IRC | IRC | NPC | NPC | NPC | NPC |
| DIVC | PRI | PRI | PRI | NCN | NPC | NPC | ENUM | ENUM | ENUM | ENUM |
|  | PUB | PUB | PUB | SNUM | ENUM | ENUM | NCN | NCN | NCN | NCN |
|  | DIVC | DIVC | DIVC | PRI | NCN | NCN | SNUM | SNUM | SNUM | SNUM |
|  |  |  |  | PUB | SNUM | SNUM | PRI | PRI | PRI | PRI |
|  |  |  |  | DIVC | PRI | PRI | PUB | PUB | PUB | PUB |
|  |  |  |  |  | PUB | PUB | DIVC | DIVC | DIVC | DIVC |
|  |  |  |  |  | DIVC | DIVC |  |  |  |  |

(DISALLOWED DLPCs)

In summary, a telecommunication switch provides flexible dial plan capabilities to allow it to be installed anywhere throughout the world. The telecommunication switch performs a digit parsing routine in order to identify dial plan codes received over trunk groups from subscribers. The dial plan codes become part of a dialing sequence that is followed by the telecommunication switch in accordance with a dial plan associated with each trunk group and stored within a dial plan database. In this manner, the telecommunications switch is not limited to installation at specific geographic locations with fixed, unflexible dial plan routines.

Thus, it is apparent that there has been provided, in accordance with the present invention, a method of parsing digits in a telecommunications switch providing a flexible dial plan that satisfies the advantages set forth above. Although the present invention has been described, it should be understood that various changes, substitutions, and alterations readily ascertainable by one skilled in the art can be made herein without departing from the spirit and scope of the present invention as defined by the following claims.

APPENDIX A

A dial plan consists of groups of digits that we will refer to as codes.

A telecommunications switching system interprets these codes and performs specific actions in its call processing stages.

Valid codes and their interpretation in a telecommunications switching system are listed below.

| | |
|---|---|
| Account Code (AC) | Combination of digits dialed by the subscriber as identification and to provide additional billing information. |
| Authorization Code (AU) | Digits dialed by the subscriber as an identification to the telecommunication network provider. Telecommunication network providers use this information for billing and identifying the class of services. |
| Calling Card Number (CCN) | A number to which the charges incurred for the calls are billed. |
| Calling Line Identification Code (CLI) | Address information of the calling subscriber passed across the telephone network. In national network, this will normally be National Significant Number. |
| Carrier Identification Code (CIC) | Combination of digits dialed by a subscriber to obtain services from a telecommunication network provider. |
| Credit/Debit Card Number (CRN/DBN) | A number to which the charges incurred for the calls are billed. |
| Country Code (CC) | Selected the destination country code. |
| Destination Network Code (DNC) | Identifies the destination network serving the destination subscriber. This can also be used to indicate identity of a network provider, whose services shall be used to complete the call. For example, if a network provider does not have an international gateway, it is possible to use gateway installed by another network provider. If more than one network provider has an international gateway switch, originating network can specify the preferred network to route the international call. |
| Division Code (DIV) | A number that identifies the destination on a private telephone network. |
| Emergency Number (ENUM) | A public emergency service number. |
| End of sequence code (EOS) | A code dialed to indicate end of information in a dialing sequence. |
| Exchange Code (EC) | Part of Subscriber Number which is used to determine a switching system network path, to complete a call. |

| | |
|---|---|
| Facility Control Code (FC) | This code indicates facilities used to route the call. For example in North American Intermachine Trunk Dial Plans, facility control digits indicate, whether call was queued for a route earlier and whether call was queued for a route earlier and whether call was routed through a satellite. This code will have system defined meanings. This code can also be obtained through message parameters specified in SS7, C7, ISDN PRI call setup messages. |
| Freephone Number (FNUM) | A called number which indicates that the charges incurred for the call are paid by the called party. |
| Information Digits (ID) | These digits are used to specify a call type normally. For example call type can be normal call, test call, call from a coin phone, International call, call from a hotel/motel. |
| International Prefix Code (IPC) | Digits to be dialed by a subscriber making a call to a subscriber in another country. |
| International Route Code (IRC) | Digits in a called number which identifies the route to international destination. |
| International Subscriber Number (ISN) | A number dialed to reach a subscriber in another country. |
| National Prefix Code (NPC) | Digits to be dialed by a subscriber making a call to a subscriber in his own country but outside his own numbering plan area (Trunk Code). |
| National Route Code (NRC) | Digits in a called number which identifies the route to national destination. |
| National Significant Number (NSN) | A number dialed to reach a subscriber within the same country outside same numbering plan area. |
| Operator Number (ONUM) | A called number which is terminated to a operator services system for call set up. |
| Partition Code (OPAR) | A code which is used to identify a route or route related information. |
| Personal Identification Number (PIN) | Similar to Authorization Code, can be dialed in addition to Authorization Code. |
| Private Speed Number (PRI) | Private speed numbers are defined by individual subscribers who have been authorized to use this feature. These numbers are translated to destination numbers (pilot numbers) as defined by the subscriber. |
| Public Speed Number (PUB) | These numbers are defined by the telephone operating companies of the area or local administration to provide fast dialing to reach certain frequently used numbers/facilities. These numbers can be dialed by any subscriber and are translated to destination numbers as defined by the local administration. |
| Service Code (SC) | To identify specific network service and to select an appropriate dial plan. |
| Special Feature Number (SNUM) | A speed number. Special Feature number has the format "#XXX", where # is DTMF digit and X si any digit 0–9. |
| Station Number (STN) | Part of Subscriber Number which is used to identify the subscriber within the same exchange. |
| Start of sequence code (SOS) | A code identifying start of information in a dialing sequence. |
| Subscriber Number (SN) | Number to be dialed to reach a subscriber within the same numbering plan area (Trunk Code). |
| Test call Number (TNUM) | Number to be dialed to initiate a testing on a trunk circuit. |
| Trunk Code (TC) | Selects the numbering area within a country or countries with integral numbering plan. In North-American Numbering plan, trunk code is known as numbering plan area (NPA). |

What is claimed is:

1. A method for parsing digits in a telecommunications switch, comprising steps of:

receiving an incoming call from an incoming trunk group;

determining a dial plan corresponding to the incoming trunk group;

accessing a record of the dial plan;

determining whether the record is associated with a peer list of additional records;

collecting digits associated with the incoming call;

identifying a digit position and a digit type for each digit collected;

assessing a bit map of dial plan codes associated with records in the peer list;

eliminating all but one of the dial plan codes in response to the digits collected, the digit positions, and the digit types;

determining whether digits corresponding to a remaining dial plan code have been collected;

perform valid actions associated with the dial plan code upon successful collection of digits for the dial plan code.

2. The method of claim 1, further comprising steps of:

identifying digits corresponding to the dial plan code that have been collected;

determining remaining digits expected for the dial plan code;

collecting remaining digits expected for the dial plan code.

3. The method of claim 1, further comprising a step of:

performing error actions in response to a collected digit not corresponding with the dial code plan.

4. The method of claim 1, further comprising a steps of:

collecting digits in an available digit buffer;

incrementing a digit position indicator for each digit collected.

5. A method for parsing digits in a telecommunications switch, comprising steps of:

receiving an incoming call from an incoming trunk group;

determining a dial plan corresponding to the incoming trunk group;

accessing a first record of the dial plan;

determining whether the first record is associated with a peer list of additional records;

collecting digits associated with the incoming call;

determining whether digits corresponding to a dial plan code associated with the first record have been collected in response to the first record not being associated with a peer list;

placing dial plan codes linked by the peer list into an ambiguous code list;

comparing each collected digit to the dial plan codes within the ambiguous code list;

removing dial plan codes from the ambiguous code list that do not have a match with each collected digit; and perform valid actions associated with the dial plan code upon successful collection of digits for the dial plan code.

6. The method of claim 5, further comprising a step of:

receiving an unacceptable digit or no digit within a pre-determined interval;

removing dial plan codes from the ambiguous code list having a pre-determined format;

removing dial plan codes from the ambiguous code list having a minimum number of expected digits greater than a number of collected digits;

performing valid actions on a first dial plan code of the ambiguous code list;

performing error actions in response to the ambiguous code list no longer having any dial plan codes.

7. The method of claim 5, further comprising steps of:

determining whether more than one dial plan code remains in the ambiguous code list;

placing dial plan codes from the ambiguous code list with lengths equal to a number of collected digits into an unresolved code list;

resolving for one dial plan code in the unresolved code list;

placing the resolved dial plan code in a look ahead list.

8. The method of claim 7, further comprising a step of:

performing valid actions associated with the resolved dial plan code in the look ahead list in response to the ambiguous code list being empty.

9. The method of claim 7, further comprising steps of:

collecting a next digit;

comparing each collected digit to the dial plan codes within the ambiguous code list;

removing dial plan codes from the ambiguous code list that do not have a match with each collected digit;

determining whether one dial plan code remains in the ambiguous code list;

performing valid actions associated with the one dial plan code remaining in the ambiguous code list.

10. The method of claim 9, further comprising a step of:

performing valid actions associated with the resolved dial plan code in the look ahead list in response to the ambiguous code list being empty.

* * * * *